United States Patent
Shaphy et al.

(10) Patent No.: US 9,465,311 B2
(45) Date of Patent: Oct. 11, 2016

(54) TARGETING ADS IN CONJUNCTION WITH SET-TOP BOX WIDGETS

(75) Inventors: Muhammed Shaphy, Irving, TX (US); Karthik Srinivasan, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1161 days.

(21) Appl. No.: 13/491,896

(22) Filed: Jun. 8, 2012

(65) Prior Publication Data
US 2012/0246676 A1  Sep. 27, 2012

Related U.S. Application Data

(63) Continuation-in-part of application No. 13/429,536, filed on Mar. 26, 2012, now Pat. No. 9,092,572.

(51) Int. Cl.
| | |
|---|---|
| *H04N 7/18* | (2006.01) |
| *H04N 9/47* | (2006.01) |
| *G03G 15/01* | (2006.01) |
| *G03G 15/00* | (2006.01) |

(52) U.S. Cl.
CPC .......... *G03G 15/0131* (2013.01); *G03G 15/50* (2013.01); *G03G 2215/0081* (2013.01)

(58) Field of Classification Search
CPC ................. H04N 7/18; H04N 7/183
USPC ......................................................... 348/61
See application file for complete search history.

(56) References Cited

U.S. PATENT DOCUMENTS

| | | | |
|---|---|---|---|
| 7,451,391 B1 | 11/2008 | Coleman et al. | |
| 7,934,162 B2 | 4/2011 | Wong et al. | |
| 2002/0004854 A1 | 1/2002 | Hartley | |
| 2004/0003400 A1 | 1/2004 | Carney et al. | |
| 2004/0107125 A1 | 6/2004 | Guheen et al. | |
| 2004/0226051 A1 | 11/2004 | Carney et al. | |
| 2008/0244681 A1 | 10/2008 | Gossweiler et al. | |
| 2008/0276279 A1 | 11/2008 | Gossweiler et al. | |
| 2009/0006179 A1* | 1/2009 | Billingsley et al. ............ 705/10 | |
| 2009/0248883 A1* | 10/2009 | Suryanarayana ..... G06F 9/4443 709/229 | |
| 2010/0313169 A1 | 12/2010 | Huang et al. | |
| 2010/0321201 A1 | 12/2010 | Huang et al. | |
| 2011/0214148 A1 | 9/2011 | Gossweiler et al. | |
| 2011/0252427 A1 | 10/2011 | Olston | |
| 2011/0258659 A1 | 10/2011 | Carney et al. | |
| 2012/0102458 A1 | 4/2012 | Meijer et al. | |
| 2012/0254912 A1 | 10/2012 | Carney et al. | |
| 2013/0024906 A9 | 1/2013 | Carney et al. | |
| 2013/0104178 A1 | 4/2013 | Babu et al. | |

* cited by examiner

*Primary Examiner* — Chikaodili E Anyikire

(57) ABSTRACT

A network device receives selection of a widget, for execution at a set-top box (STB) associated with a customer, from multiple widgets stored at a server, where each of the multiple widgets includes a software application that the STB can execute to render graphics or images on a screen or to perform other functions associated with the STB. The network device analyzes information associated with the customer and the widget, and selects an ad for the customer based on the analysis, where the ad relates to a product or service available for purchase. The network device causes the selected widget and the selected ad to be delivered to the STB.

23 Claims, 25 Drawing Sheets

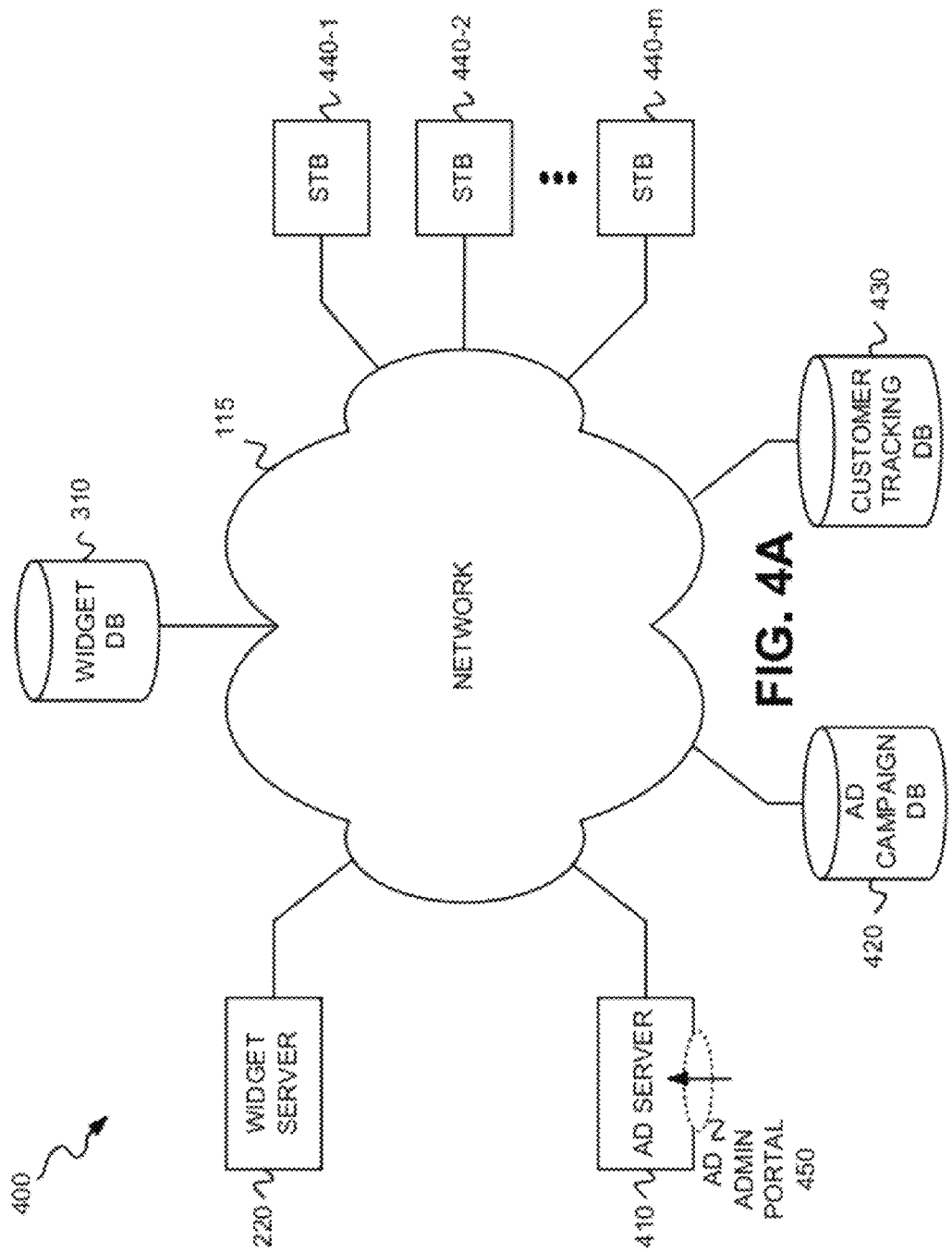

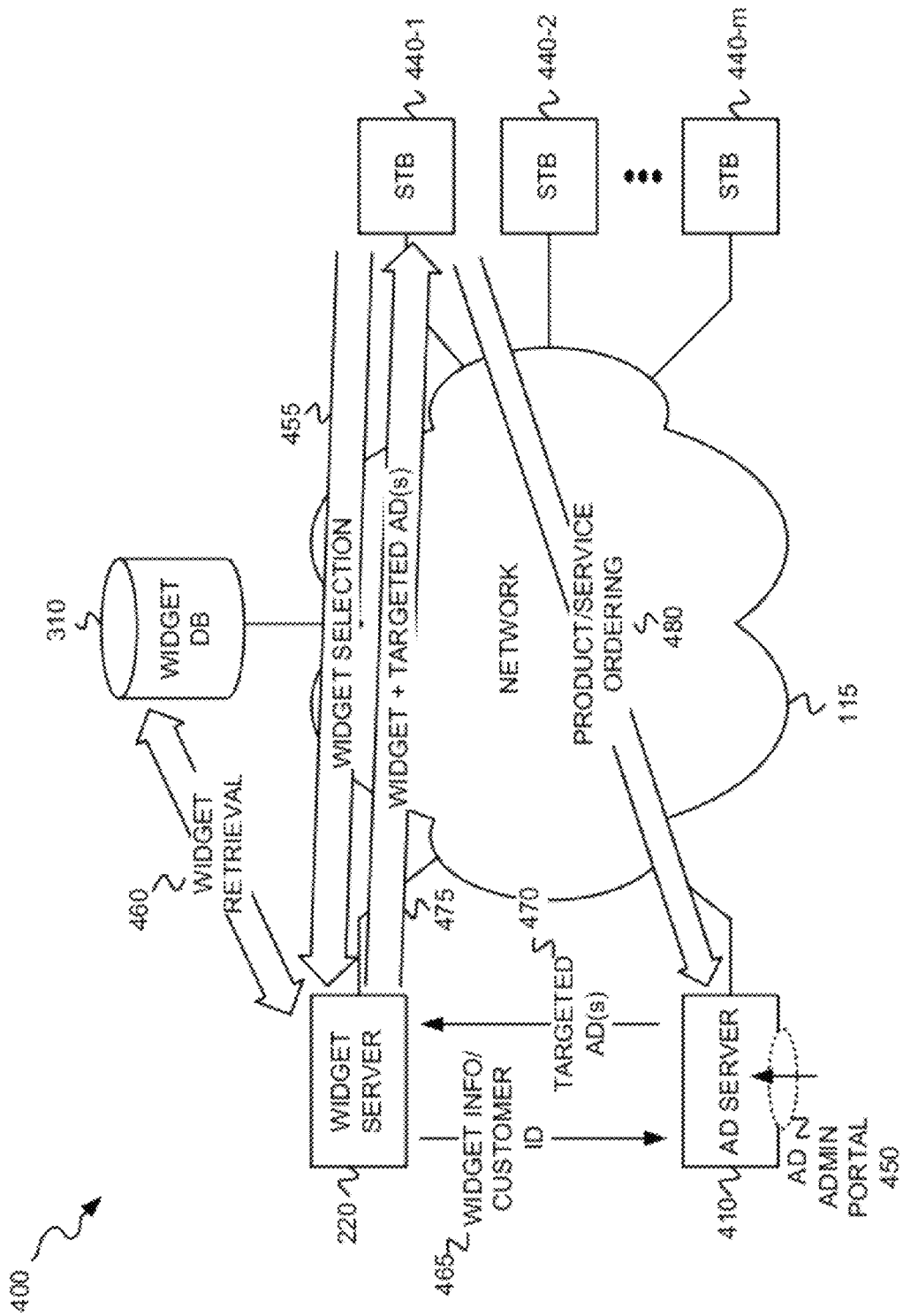

TARGETING ADS IN CONJUNCTION WITH SET-TOP BOX WIDGETS

RELATED APPLICATION

The present application is a continuation-in-part (CIP) of U.S. application Ser. No. 13/429,536, entitled "Development Life Cycle Management Tool For Set-Top Box Widgets" and filed Mar. 26, 2012, the disclosure of which is incorporated by reference herein in its entirety.

BACKGROUND

Set-Top Boxes (STBs) are used primarily for tuning among channels on a network, such as, for example, a cable network (e.g., an optical fiber network), to acquire and lock to specific channels to enable content transmitted on those channels to be displayed on display devices (e.g., televisions) connected to each of the STBs. STBs may have the capability to store and execute widgets. These widgets include small applications that the STB can execute to render graphics and images on the television screen, and to perform other functions.

BRIEF DESCRIPTION OF THE DRAWINGS

FIG. 4A depicts an exemplary network environment in which targeted ads may be provided to customers associated with STBs in conjunction with widgets provided by a widget server to those STBs;

FIG. 4B depicts the targeting of ads, in the network environment of FIG. 4A, to customers in conjunction with the delivery of widgets to STBs associated with those customers;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Figure 1:
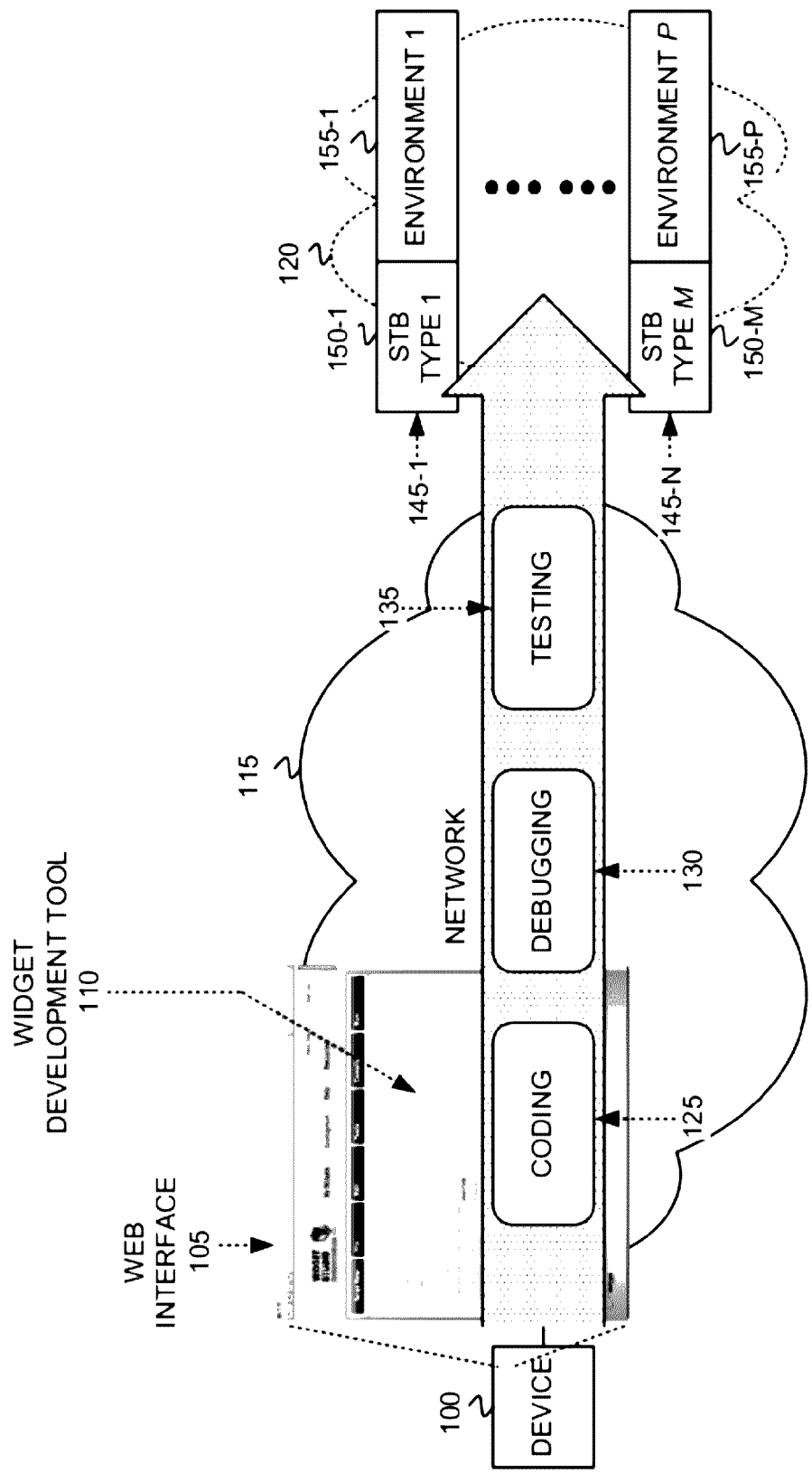
FIG. 1 is a diagram that illustrates an exemplary overview of the use of a web-based development tool that can be used to develop custom set-top box (STB) widgets.

FIG. 1 illustrates an exemplary overview of the use of a web-based development tool that can be used to develop custom set-top box (STB) widgets. A "widget," as referred to herein, includes a small software application that a STB can execute to render graphics or images on a screen (e.g., television screen), and/or to perform other functions associated with the STB. As shown in FIG. 1, a device 100 may use a web interface 105 to access a widget development tool 110 via a network 115. Device 100 may include, for example, a telephone (e.g., smart phone); a laptop, desktop, palmtop or tablet computer; a personal digital assistant (PDA); or any other type of digital computing device that may communicate via network 115. Device 100 may implement a web browser that may access widget development tool 110 via web interface 105. Widget development tool 110 may include a web-based, interactive widget development life cycle (WDLC) management tool that can be used to code, debug, and test one or more customized widgets for execution by multiple different STBs 145-1 through 145-N within a cloud environment 120.

As depicted in FIG. 1, the development life cycle management processes performed by widget development tool 110 may include coding 125, debugging 130, and testing 135. Coding 125 may include a user of device 100 entering new script and/or editing existing script for a custom widget. In one exemplary implementation, a customer widget may be coded using the Lua programming language. Other programming languages, however, may alternatively be used. Debugging 130 may include using debugging functionality of widget development tool 110 to execute a custom widget, within a STB having a selected STB type and a selected STB environment, in a debug mode such that debug results can be viewed by the user of device 100. Testing 135 may include the creation of one or more test cases to be executed along with a selected custom widget, and the line-by-line execution of the one or more test cases, along with execution of a custom widget, to generate a test results summary that may be viewed by a user of device 100. Each of the test cases may define one or more interactions that occur with a STB, such as, for example, one or more button selections on the STB's remote control. A test case may be executed in conjunction with the execution of a custom widget to identify whether the one or more interactions of the test case are successful when the widget is executing. A test case may, therefore, provide simulated user input and interaction with a STB executing a widget.

STBs 145-1 through 145-N may reside in a cloud environment 120 and may include multiple different types 150-1 through 150-M of STBs and multiple different environments 155-1 through 155-P. Types 150-1 through 150-M of STBs may include a different manufacturer and/or model for each different type. Environments 155-1 through 155-P may each include different hardware, firmware, or middleware, and/or a different operating system. Therefore, each STB 145 in cloud environment 120 may include its own unique combination of STB type 150 and STB environment 155. Each of STBs 145-1 through 145-n in cloud environment 120 may include a real STB (e.g., stand alone) or a virtual STB (e.g., simulated within another network device).

Figure 2:
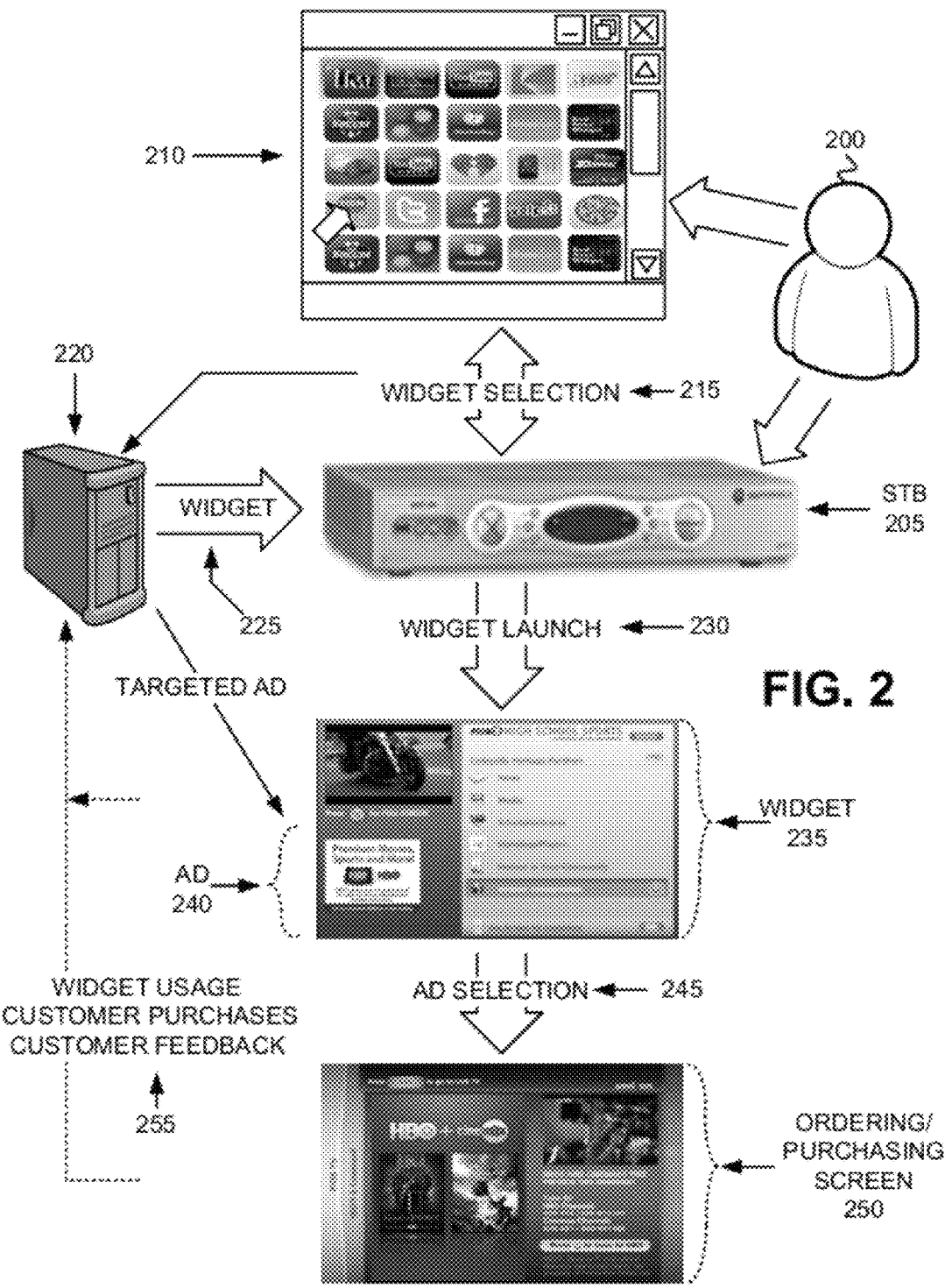
FIG. 2 is a diagram that illustrates an exemplary overview of the targeting of advertisements to customers of a network service based on, among other factors, customer STB widget usage.

FIG. 2 illustrates an exemplary overview of the targeting of advertisements to customers of a network service based on, among other factors, customer usage of widgets developed using the web-based development tool 110 of FIG. 1. As shown in FIG. 2, a customer 200 of a network service may use the customer's STB 205 to view and select a widget from a widget selection interface 210 for execution of the widget at STB 205. The widgets that can be viewed and selected via widget selection interface 210 may have previously been created using the web-based development tool 110 described above with respect to FIG. 1. Customer 200 may perform a widget selection 215 from widget selection interface 210, and, in response, a widget server 220 may send the selected widget to STB 205, along with an ad 240 that is targeted to customer 200.

Subsequent to receipt of the selected widget from STB 205, customer 200 may launch 230 the widget at STB 205, and STB 205 may present the launched widget 235 to customer 200 along with ad 240 that was targeted to customer 200. If customer 200 has interest in the product or service advertised by ad 240, customer 200 may select 245 add 240 via STB 205. Upon further selection 245 of ad 240, STB 205 may present an offer for the advertised product or service via an ordering/purchasing screen 250.

The usage of widgets by customer 200 at STB 205, the usage of widgets by other customers (not shown), customer 200's purchases of products or services based on targeted ads, other customers' (not shown) purchases of products or services based on targeted ads, customer 200's feedback regarding purchased products or services, or other customers' feedback regarding purchased products or services may be used as shown at 255 in FIG. 2 by an ad server (not shown) for targeting ads to customer 200. The ad server may generate an ad at the time that customer 200 accesses a widget, and may supply that targeted ad to widget server 220 for provision to customer 200 at STB 205 along with the selected widget.

Figure 3:
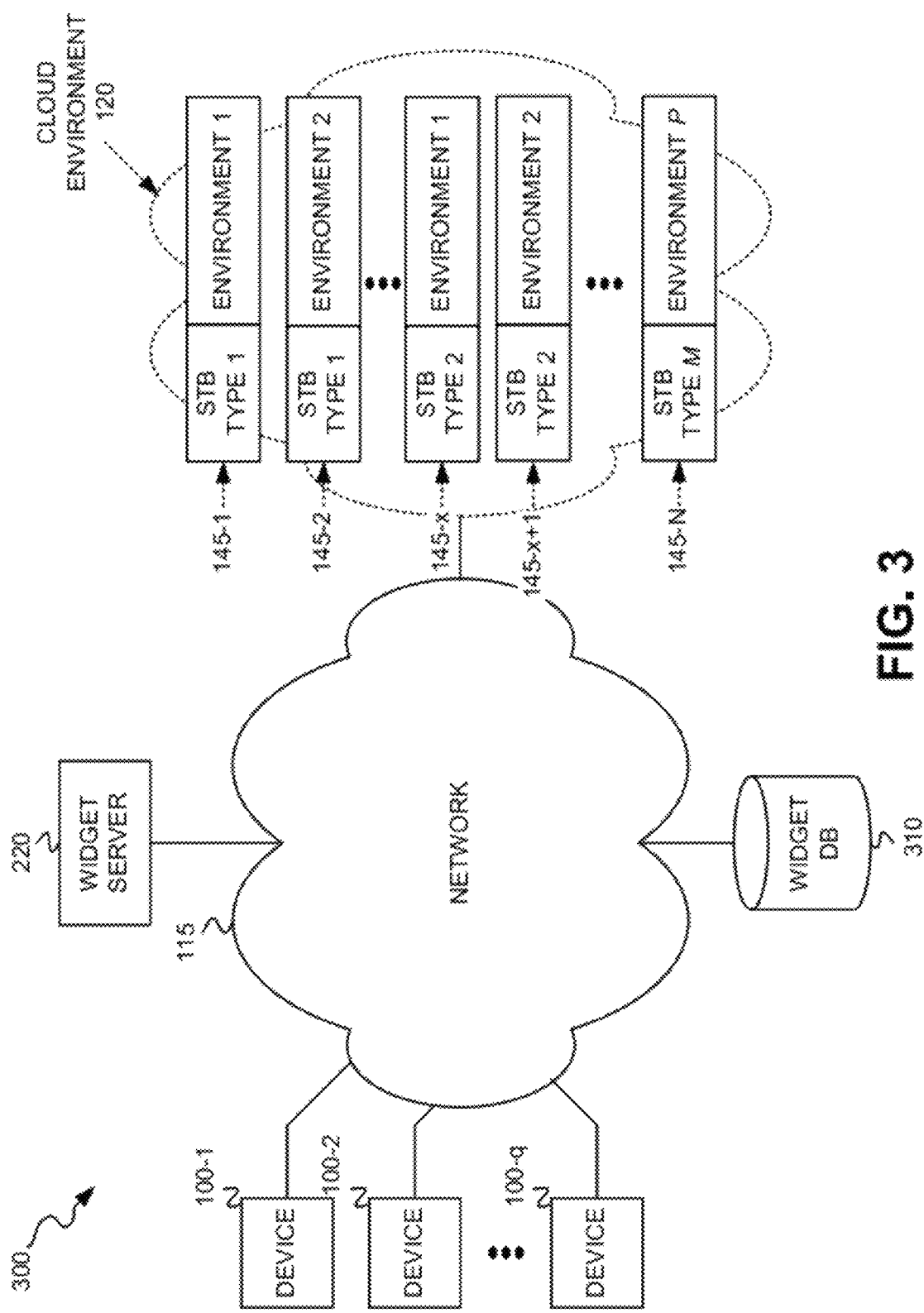
FIG. 3 is a diagram that depicts an exemplary network environment in which the widget development tool of FIG. 1 may be accessed via a web interface at multiple different devices to create and/or edit custom widgets that can be tested and/or executed by one or more STBs in a cloud environment.

FIG. 3 depicts an exemplary network environment 300 in which widget development tool 110 (shown in FIG. 1) may be accessed via web interface 105 at multiple different devices 100-1 through 100-q to create and/or edit custom widgets that can be tested within STBs 145-1 through 145-N in cloud environment 120. As shown, network environment 300 may include devices 100-1 through 100-q, network 115, cloud environment 120, widget server 220 and widget database (DB) 310.

Widget server 220 may include a network device that enables devices 100 to access, retrieve and execute widget development tool 110 via web interface 105 (not shown in FIG. 3). Widget server 220 may enable users at devices 100-1 through 100-q to execute widget development tool 110 to create, debug, and/or test custom widgets, and to retrieve and/or store custom widgets in widget DB 310. Widget DB 310 may include a network device that stores a data structure, such as, for example, a database. Widget DB 310 may store, among other data, custom widgets created or edited by users at devices 100-1 through 100-q.

Cloud environment 120 may include multiple different STBs 145-1 through 145-N, with, as described above with respect to FIG. 1, each of STBs 145-1 through 145-N having a different unique combination of a STB type and a STB environment.

The configuration of components of network environment 300 illustrated in FIG. 3 is for illustrative purposes. Other configurations may be implemented. Network environment 300 may include additional, fewer and/or different components than those depicted in FIG. 3.

FIGS. 4A and 4B depict an exemplary network environment 400 in which targeted ads may be provided to customers associated with STBs in conjunction with widgets provided by widget server 220 to those STBs. Network environment 400 may include widget server 220, widget DB 310, an ad server 410, an ad campaign DB 420, a customer tracking DB 430, STBs 440-1 through 440-m (where, in one environment, m>2)(generically and individually referred to herein as "STB 440"), and network 115. Widget server 220, widget DB 310 and network 115 have been described above with respect to FIGS. 1-3.

Ad server 410 may receive and store ad campaign information in ad campaign DB 420. Ad server 410 may implement an ad administration portal 450 to enable ad campaign information to be entered, retrieved, and/or altered in ad campaign DB 420. Ad server 410 may also track customer widget usage, customer STB activity, customer ad conversions, and customer feedback associated with ads and/or purchases and may store this customer data in customer tracking DB 430. Ad server 410 may additionally analyze the ad campaign information stored in ad campaign DB 420 and the customer data stored in customer tracking DB 430 to target ads to customers obtaining widgets from widget server 220. Ad server 410 may further deliver the targeted ads to widget server 220 for delivery to customers at STBs 440-1 through 440-m. Ad server 410 may also, upon selection of an ad by a customer at STB 440, present a product or service offer to the customer and, if the customer purchases or orders the offered produce or service, may cause the purchased/ordered product or service to be delivered to the customer.

Ad campaign DB 420 may include a data structure that stores ad campaign information. Such ad campaign information may include, for example, an identification of the product or service to be advertised, information about the product or service to be advertised (e.g., price, product description), and advertisement graphics to be used in ads.

Customer tracking DB 430 may include a data structure that stores customer data, such as, for example, customer identification data, customer widget usage data, customer STB activity data, customer ad conversion data and customer feedback data. Exemplary fields of the data structure stored in customer tracking DB 430 are described below with respect to FIG. 8.

STBs 440-1 through 440-m may each include any type of a set top box that permits a customer to select TV and/or Video On Demand (VOD) programs to view on a display device (not shown). STBs 440-1 through 440-m may further enable customers to select and retrieve widgets from widget server 220 for execution at STBs 440-1 through 440-m. In some embodiments, STBs 440-1 through 440-m may each include a digital video recorder (DVR) for digitally recording TV programs. STB 440, shown in FIG. 4A, corresponds to STB 205 depicted in FIG. 2.

FIG. 4B depicts the targeting of ads, in the network environment 400 of FIG. 4A, to customers in conjunction with the delivery of widgets to STBs associated with those customers. As shown in FIG. 4B, selection 455 of a widget may be sent from a STB 440 to widget server 220. A customer (not shown) at STB 440 may select a widget from a widget selection interface (not shown), and STB 440 may send a message to widget server 220 that identifies the selected widget. Widget server 220 may, upon receipt of the widget selection 455 from STB 440, retrieve 460 the selected widget from widget DB 310. Widget server 220 may also, upon receipt of the widget selection 455 from STB 440, send widget information and customer identification 465 to ad server 410. Ad server 410 may use the widget identification and customer identification 465 to retrieve customer data from customer tracking DB 430 (not shown in FIG. 4B) and may analyze the widget information and customer identification 465 to target an ad to the customer. Ad server 410 may send the targeted ad 470 to widget server 220 and, upon receipt of targeted ad 470, widget server 220 may deliver the selected widget and the targeted ad 475 to STB 440.

Upon receipt of the selected widget and the targeted ad 475 at STB 440, the customer (not shown) may choose to order/purchase 480 the product or service offered by the targeted ad 470. Subsequent to the order/purchase 480 of the offered product or service, ad server 410 may cause the purchased/ordered product or service to be delivered (not shown) to the customer associated with STB 440.

Figure 5:
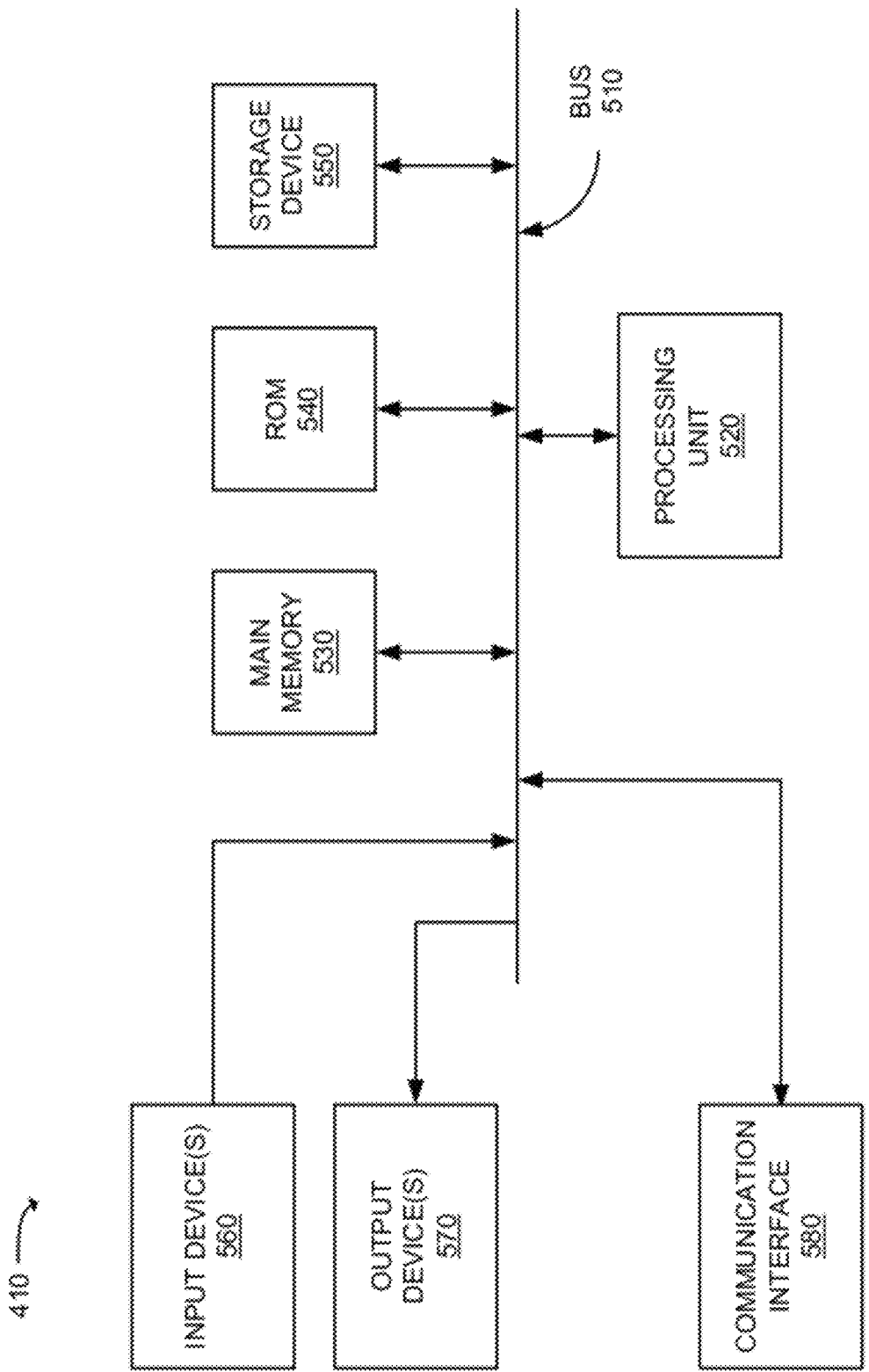
FIG. 5 is a diagram that depicts exemplary components of the ad server of FIG. 4A.

FIG. 5 is a diagram that depicts exemplary components of ad server 410. Device 100, widget server 220, widget DB 310, ad campaign DB 420 and customer tracking DB 430 may be similarly configured. Ad server 410 may include a bus 510, a processing unit 520, a main memory 530, a read only memory (ROM) 540, a storage device 550, an input device(s) 560, an output device(s) 570, and a communication interface(s) 580. Bus 510 may include a path that permits communication among the components of ad server 410.

Processing unit 520 may include one or more processors or microprocessors, or processing logic, which may interpret and execute instructions. Main memory 530 may include a random access memory (RAM) or another type of dynamic storage device that may store information and instructions for execution by processing unit 520. ROM 540 may include a ROM device or another type of static storage device that may store static information and instructions for use by processing unit 520. Storage device 550 may include a magnetic, optical, and/or other type of data storage device (e.g., a flash drive). Main memory 530, ROM 540 and storage device 550 may each be referred to herein as a "tangible non-transient computer-readable medium."

Input device 560 may include one or more mechanisms that permit an operator to input information to ad server 410, such as, for example, a keypad or a keyboard, a display with a touch sensitive panel, voice recognition and/or biometric mechanisms, etc. Output device 570 may include one or more mechanisms that output information to the operator, including a display, a speaker, etc. Communication interface(s) 580 may include a transceiver that enables ad server 410 to communicate with other devices and/or systems. For example, communication interface(s) 480 may include wired or wireless transceivers for communicating via network 115.

The configuration of components of ad server 410 illustrated in FIG. 5 is for illustrative purposes. Other configurations may be implemented. Therefore, ad server 410 may include additional, fewer and/or different components than those depicted in FIG. 5.

Figure 6:
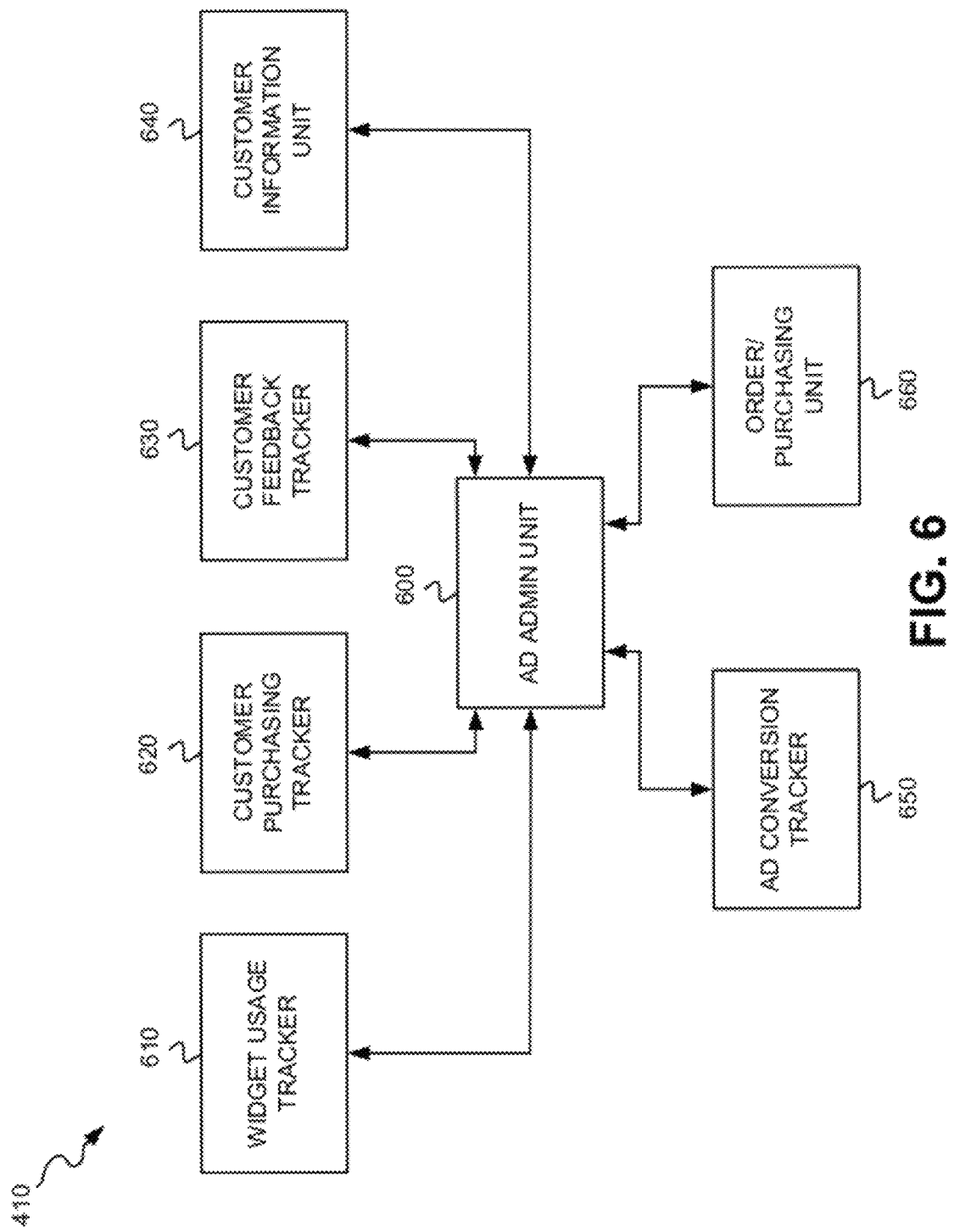
FIG. 6 is a diagram that depicts exemplary functional components of the ad server of FIG. 4A.

FIG. 6 is a diagram that depicts exemplary functional components of ad server 410. The functional components of ad server 410 depicted in FIG. 6 may be implemented in software, hardware, or in a combination of software and hardware. In one implementation, the functional components of ad server 410 depicted in FIG. 6 may be implemented as instructions stored in main memory 530 and executed by processing unit 520. The functional components of ad server 410 may include ad administration (admin) unit 600, a widget usage tracker 610, a customer purchasing tracker 620, a customer feedback tracker 630, a customer information unit 640, an ad conversion tracker 650 and an order/purchasing unit 660.

Ad admin unit 600 may coordinate the functions of trackers 610, 620, 630 and 650 and units 640 and 660 and may perform the analysis of the ad campaign information and the customer data to target ads to individual customers retrieving and/or executing widgets. Ad admin unit 600 may implement ad administration portal 450 to enable administration of the ad campaigns.

Widget usage tracker 610 may track the usage of widgets by customers at STBs 440-1 through 440-m. Customer purchasing tracker 620 may track the ordering/purchasing of products or services advertised in targeted ads delivered to customers at STBs 440-1 through 440-m. Customer feedback tracker 630 may track feedback of customers at STBs 440-1 through 440-m associated with targeted ads and/or purchases made as a result of the targeted ads. Customer information unit 640 may obtain and store information, associated with customers at STBs 440-1 through 440-m, in customer tracking DB 430. Ad conversion tracker 650 may track ad conversions that occur in conjunction with customers at STBs 440-1 through 440-m viewing targeted ads. Order/purchasing unit 660 may perform the product or service ordering/purchasing process based on targeted ads.

The functional components of ad server 410 are shown in FIG. 6 for illustrative purposes. Other configurations of functional components may be implemented. Therefore, ad server 410 may include additional, fewer and/or different functional components than those depicted in FIG. 6.

Figure 7:
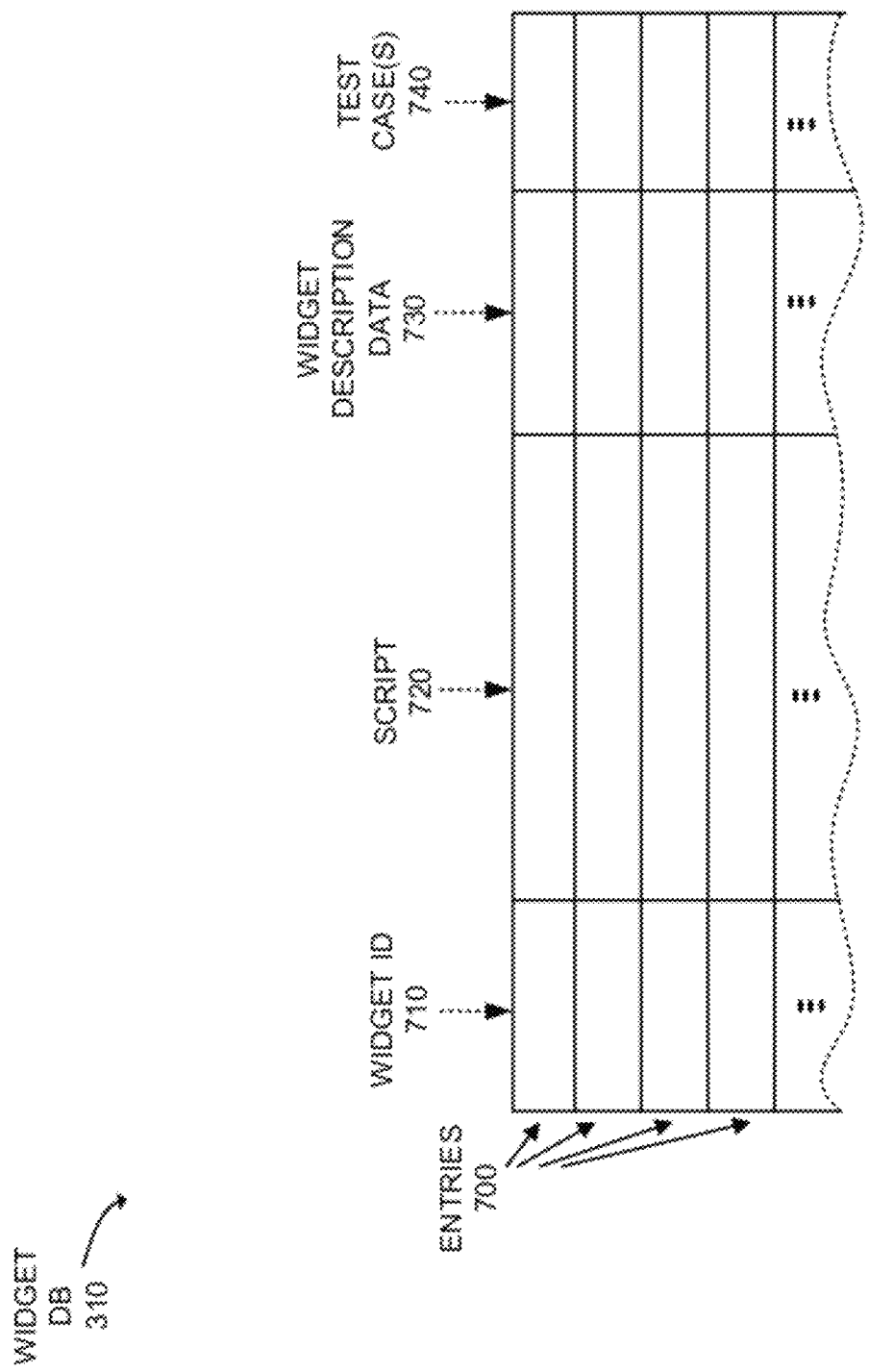
FIG. 7 is a diagram that depicts an exemplary implementation of the widget database of FIG. 3.

FIG. 7 is a diagram that depicts an exemplary implementation of widget DB 310. As shown, widget DB 310 may include a data structure that includes multiple entries 700, with each entry 700 including a widget identifier (ID) field 710, a script field 720, a widget description data field 730, and a test case(s) field 740.

Widget ID field 710 may store a unique ID for a custom widget created and/or edited by a user at a device 100. Script field 720 may store script (e.g., code) for the custom widget identified by widget ID field 710 of a respective entry 700. Widget description data field 730 may store various data about the custom widget identified by widget ID field 710 of a respective entry 700. For example, widget description data field 730 may include a name, a creation date, a date the widget was last updated, and/or a textual description of a purpose or function of the custom widget. Test case(s) field 740 may store one or more test cases that have been generated by users at devices 100-1 through 100-q for testing the custom widget identified by widget ID field 710 of a respective entry 700.

The number, types, and content of the entries and/or fields in widget DB 310 illustrated in FIG. 7 are for illustrative purposes. Other data structures having different content in the entries and/or the fields, having different types of entries and/or fields, or having different numbers of the entries and/or the fields may be implemented. Therefore, widget DB 310 may include additional, fewer and/or different entries and/or fields than those depicted in FIG. 7.

Figure 8:
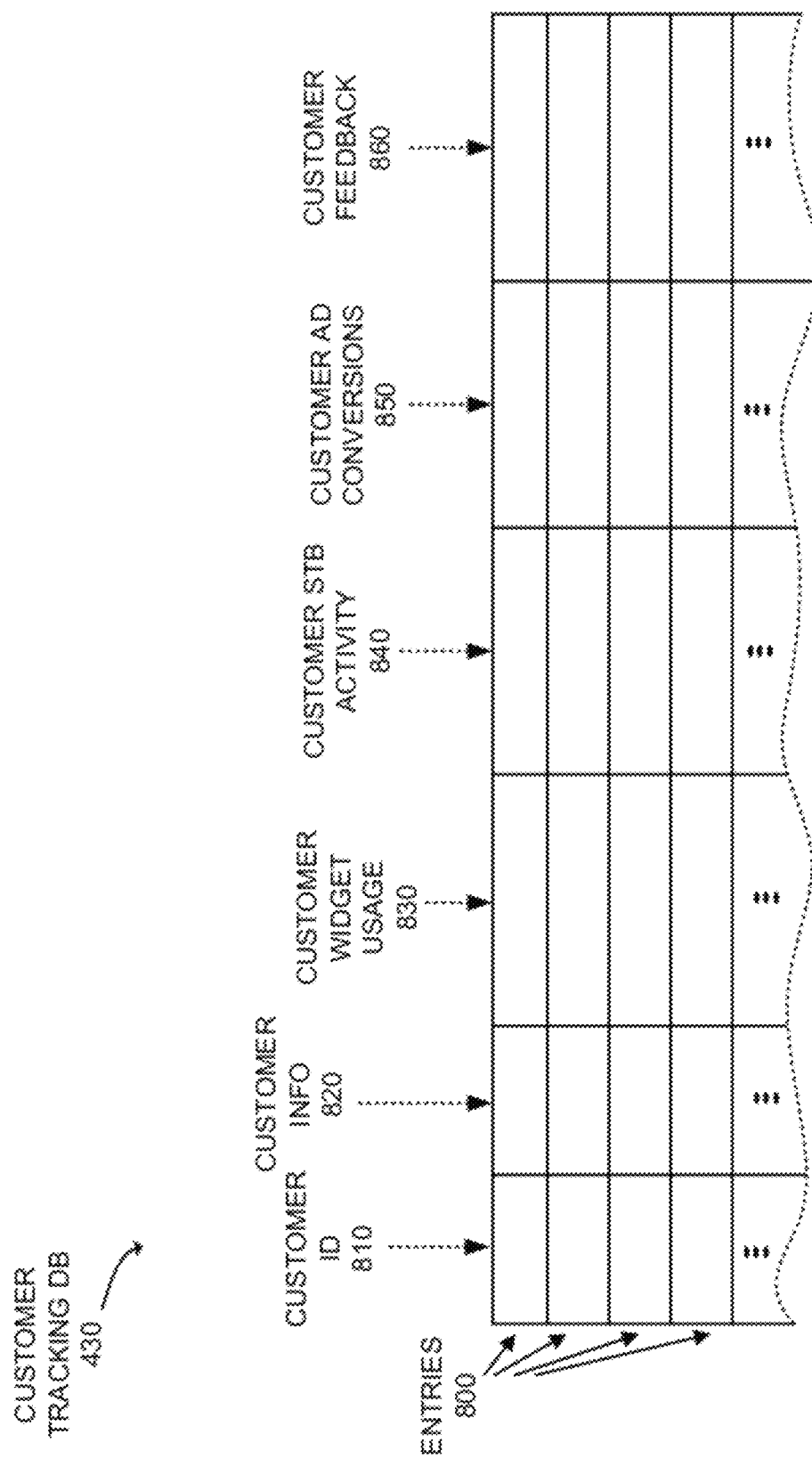
FIG. 8 is a diagram that depicts an exemplary implementation of the customer tracking database of FIG. 4A.

FIG. 8 is a diagram that depicts an exemplary implementation of customer tracking DB 430. As shown, customer tracking DB 430 may include a data structure that includes multiple entries 800, with each entry 800 including a customer ID field 810, a customer information field 820, a customer widget usage field 830, a customer STB activity field 840, a customer ad conversions field 850, and a customer feedback field 860.

Customer ID field 810 stores data that uniquely identifies a customer associated with a STB 440. Customer information field 820 stores data that describes the customer identified by customer ID field 810 including, for example, the customer's name, address, phone number, and/or email address. Customer widget usage field 830 stores data that details usage of one or more widgets obtained from widget server 220 by the customer identified by customer ID field 810. Customer STB activity field 840 stores data that details STB activity by the customer identified by customer ID field 810. The STB activity may include various types of actions performed by customers at STBs 440-1 through 440-m. The STB activity may include, for example, Video On Demand (VOD) viewing; channels, programs and/or movies watched; and/or programs and/or movies set for digital video recording. The STB activity may include other types of STB activity not detailed here.

Customer ad conversions field 850 stores data that identifies ad conversions performed by the customer identified by customer ID field 810. The ad conversions identified in field 850 may include each selection of a targeted ad by a customer to view the corresponding advertisement. Alternatively, the ad conversions may include each order, or purchase, of an advertised product or service that the customer makes after viewing the associated targeted advertisement. Customer feedback field 860 stores data that includes customer feedback provided by the customer identified by customer ID field 810. The customer feedback may relate to specific widgets used by the customer, to targeted ads presented to the customer, or to products or services purchased subsequent to the presentation of targeted ads to the customer.

The number, types, and content of the entries and/or fields in customer tracking DB 430 illustrated in FIG. 8 are for illustrative purposes. Other data structures having different content in the entries and/or the fields, having different types of entries and/or fields, or having different numbers of the entries and/or the fields may be implemented. Therefore, customer tracking DB 430 may include additional, fewer and/or different entries and/or fields than those depicted in FIG. 8.

Figure 9A:
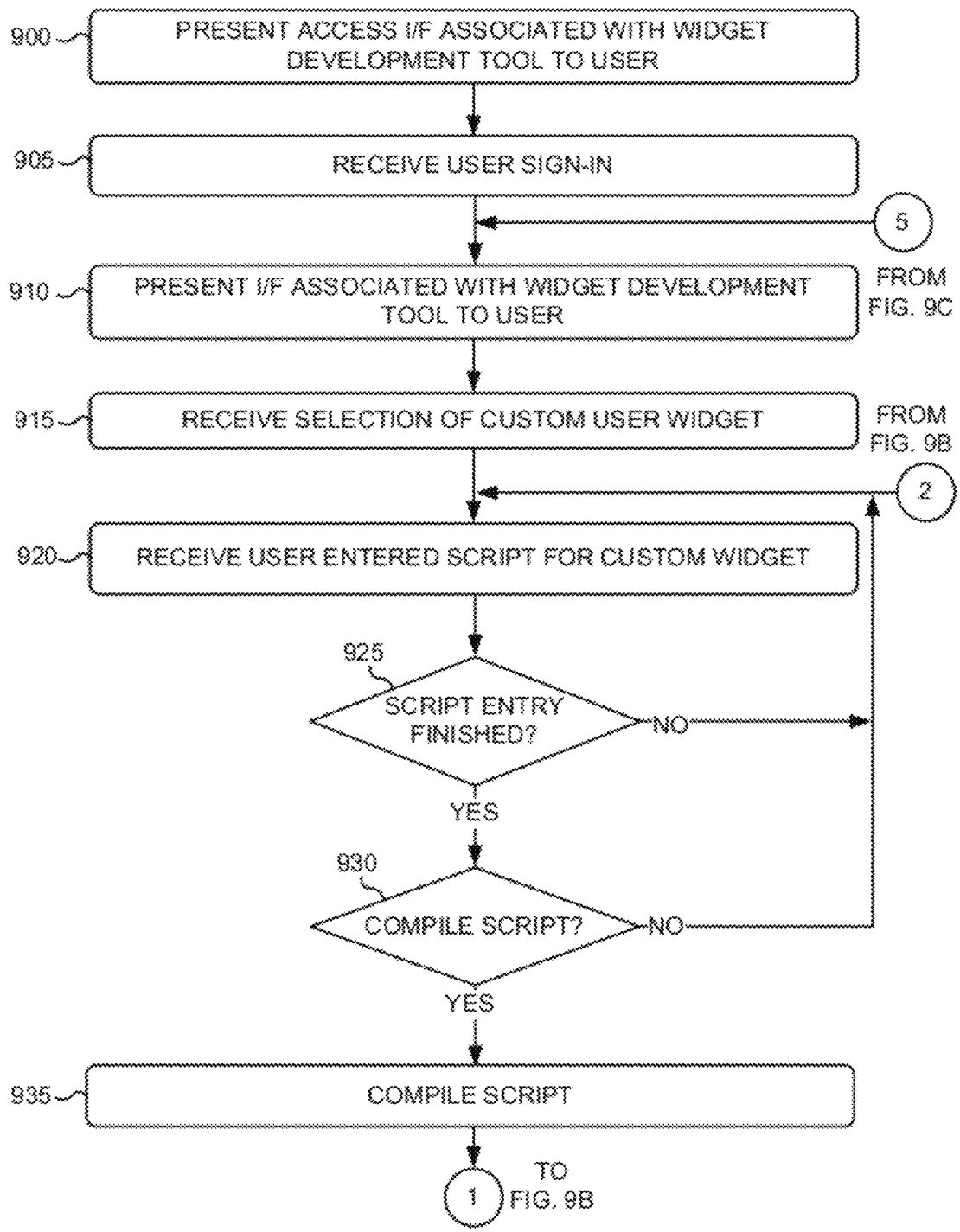
FIGS. 9A-9C are flow diagrams that depict an exemplary process for creating custom widgets using the widget development tool of FIG. 1.
Figure 9B:
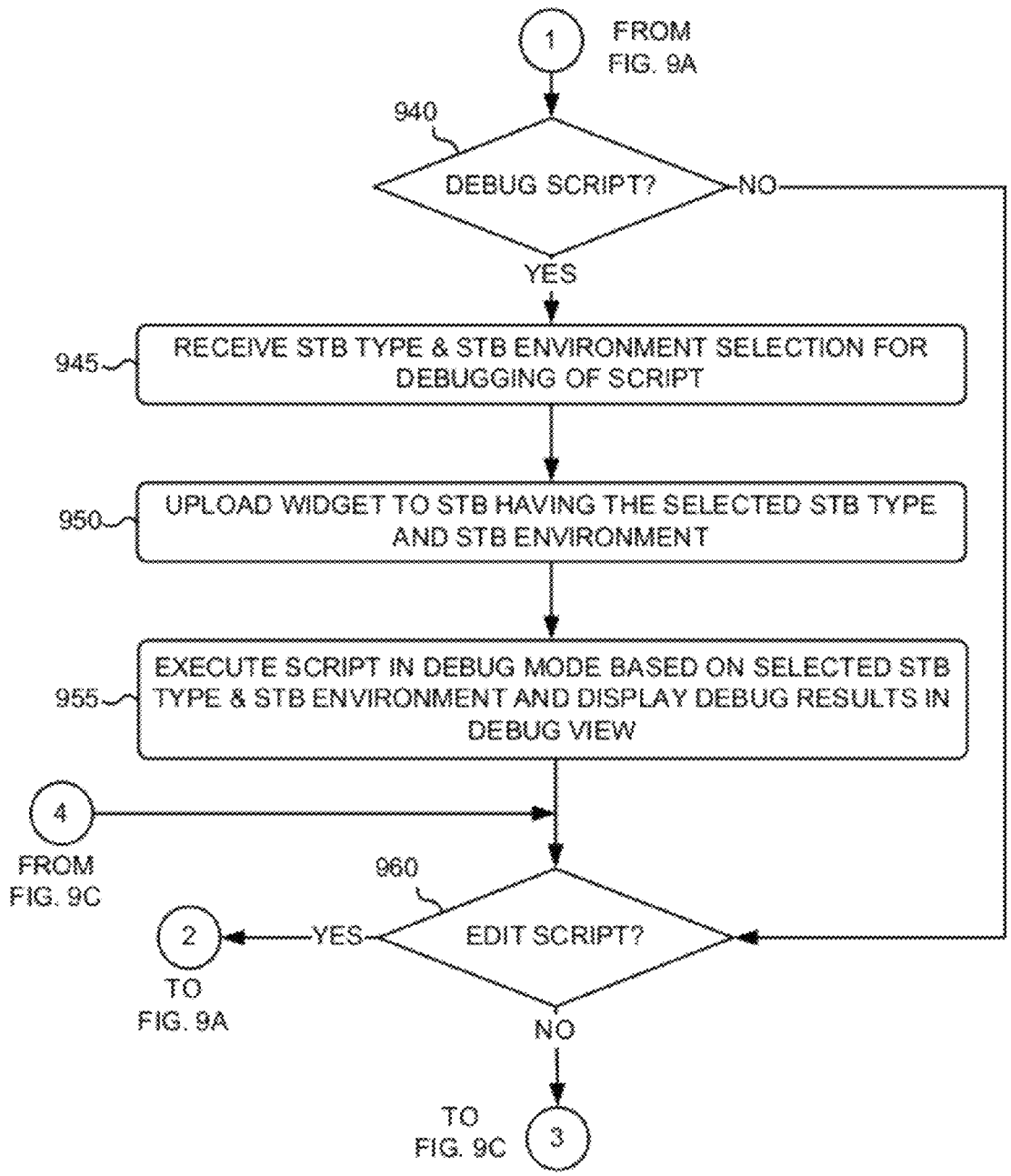
Figure 9C:
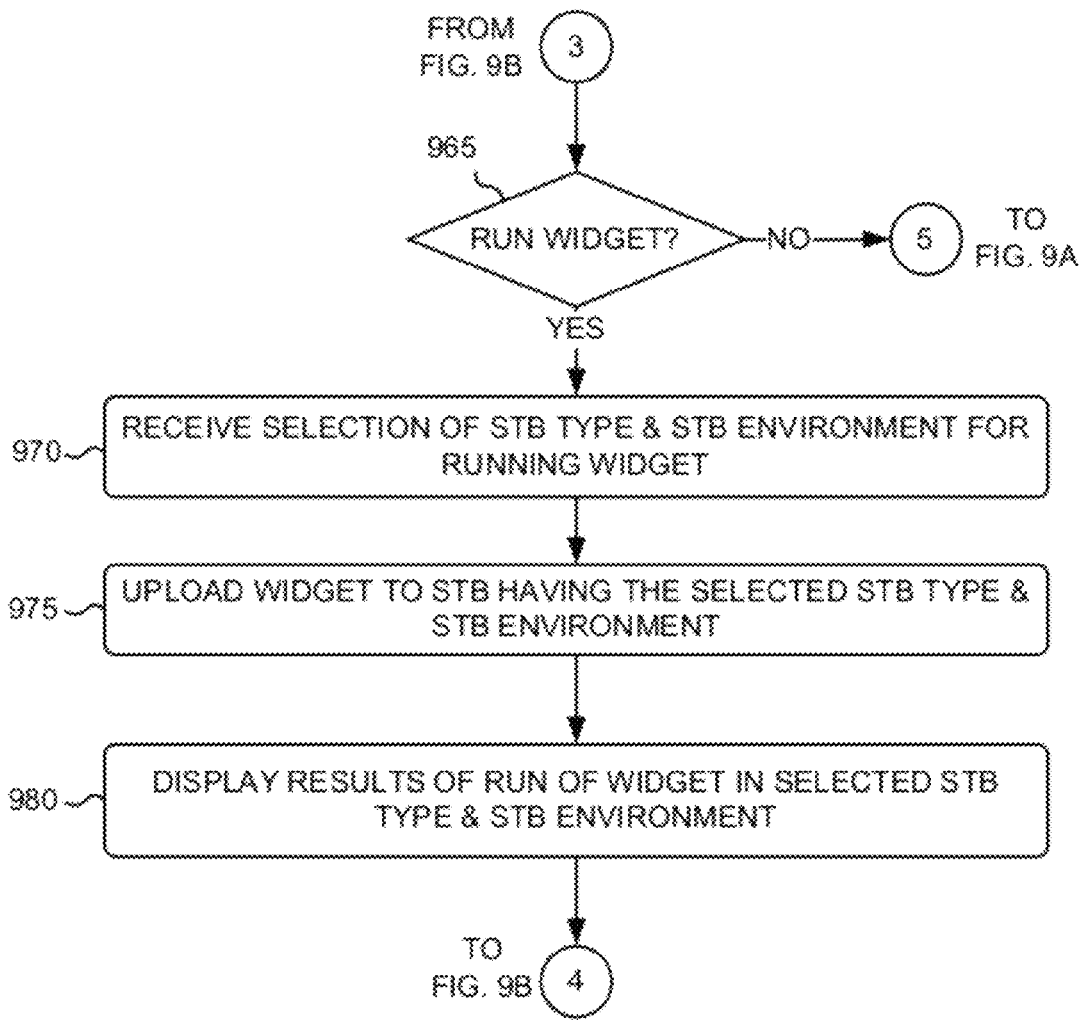

FIGS. 9A-9C are flow diagrams that depict an exemplary process for creating custom widgets using widget development tool 110. The exemplary process of FIGS. 9A-9C may be implemented by widget server 220 in conjunction with the execution of widget development tool 110 by device 100 via web interface 105. The description of the exemplary process of FIGS. 9A-9C below refers to the examples of FIGS. 10-15.

Figure 10:
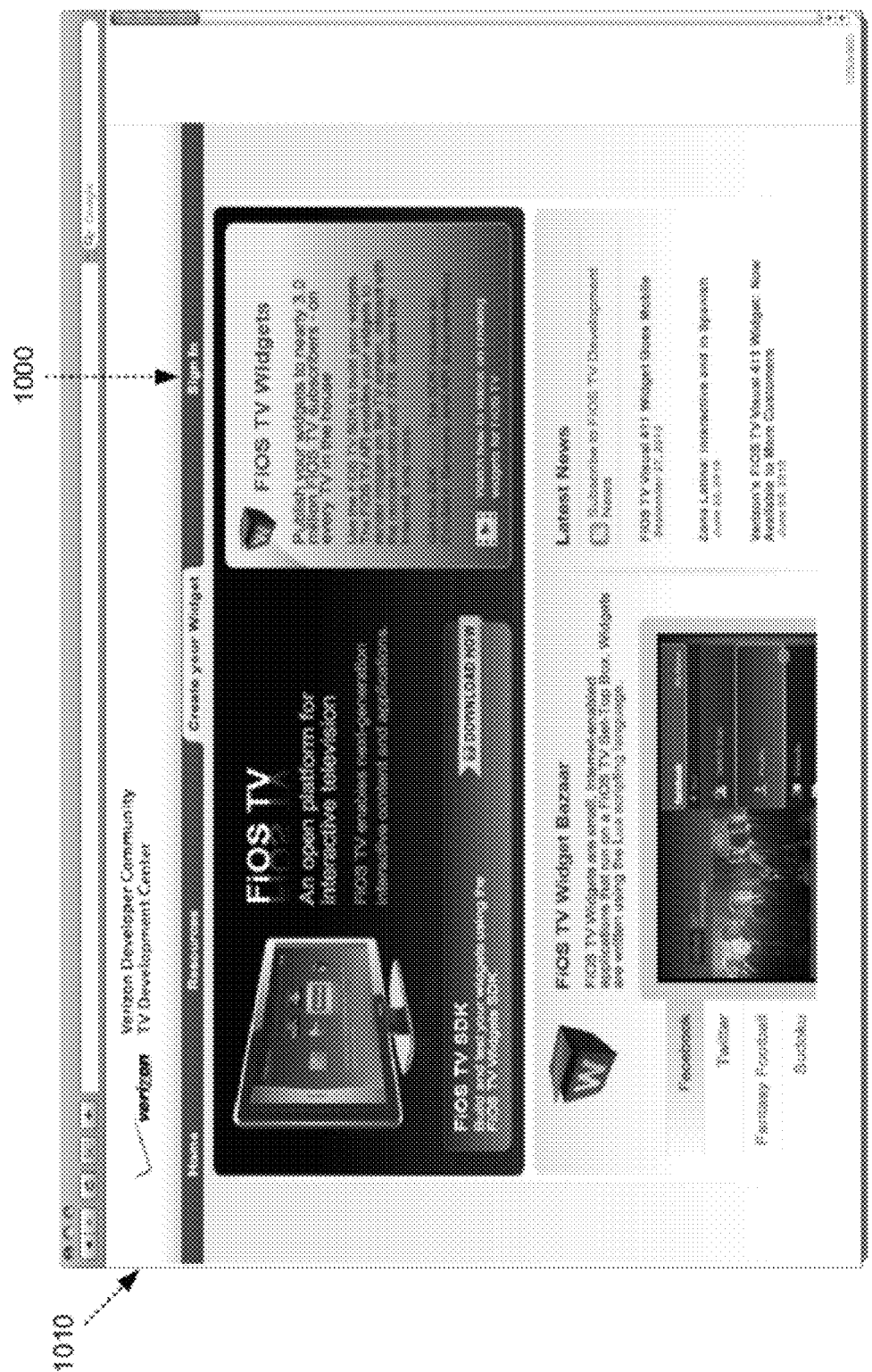
FIGS. 10-15 are diagrams that depict examples associated with the exemplary process of FIGS. 9A-9C.
Figure 11:
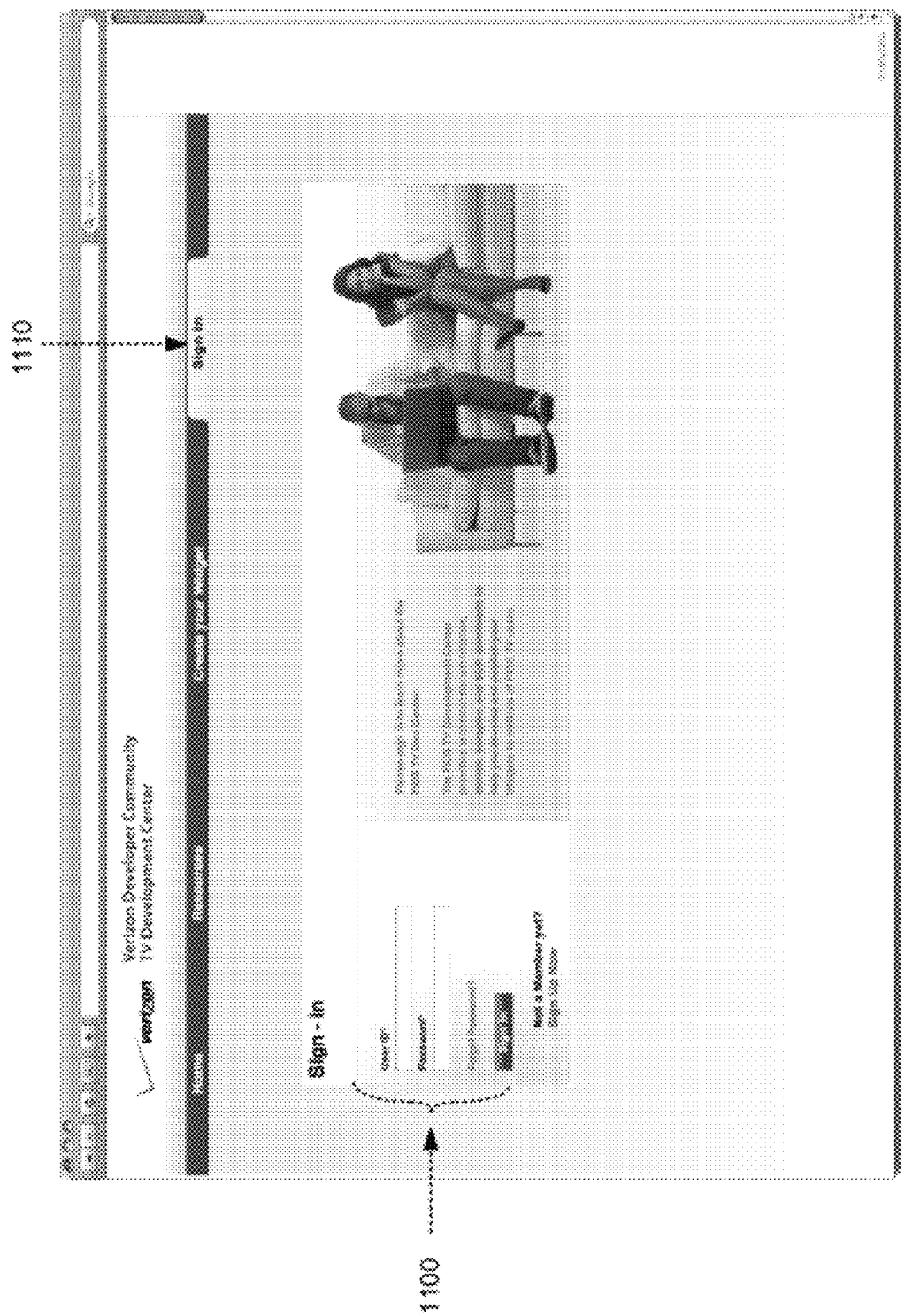

The exemplary process may include widget server 310 presenting an access interface associated with widget development tool 110 to the user of device 100 (block 900). Device 100, via a web browser and web interface 105, may access one or more interfaces associated with widget development tool 110. For example, as shown in FIG. 10, device 100 may select (e.g., "click on") a "sign-in" tab 1000 in an access interface 1010. Widget server 310 may receive the user sign-in (block 905). Device 100 may receive the user's ID and password via web interface 105. For example, as shown in FIG. 11, the user's user ID and password 1100 may be entered within a "sign-in" window 1110 presented to the user via device 100.

Figure 12:
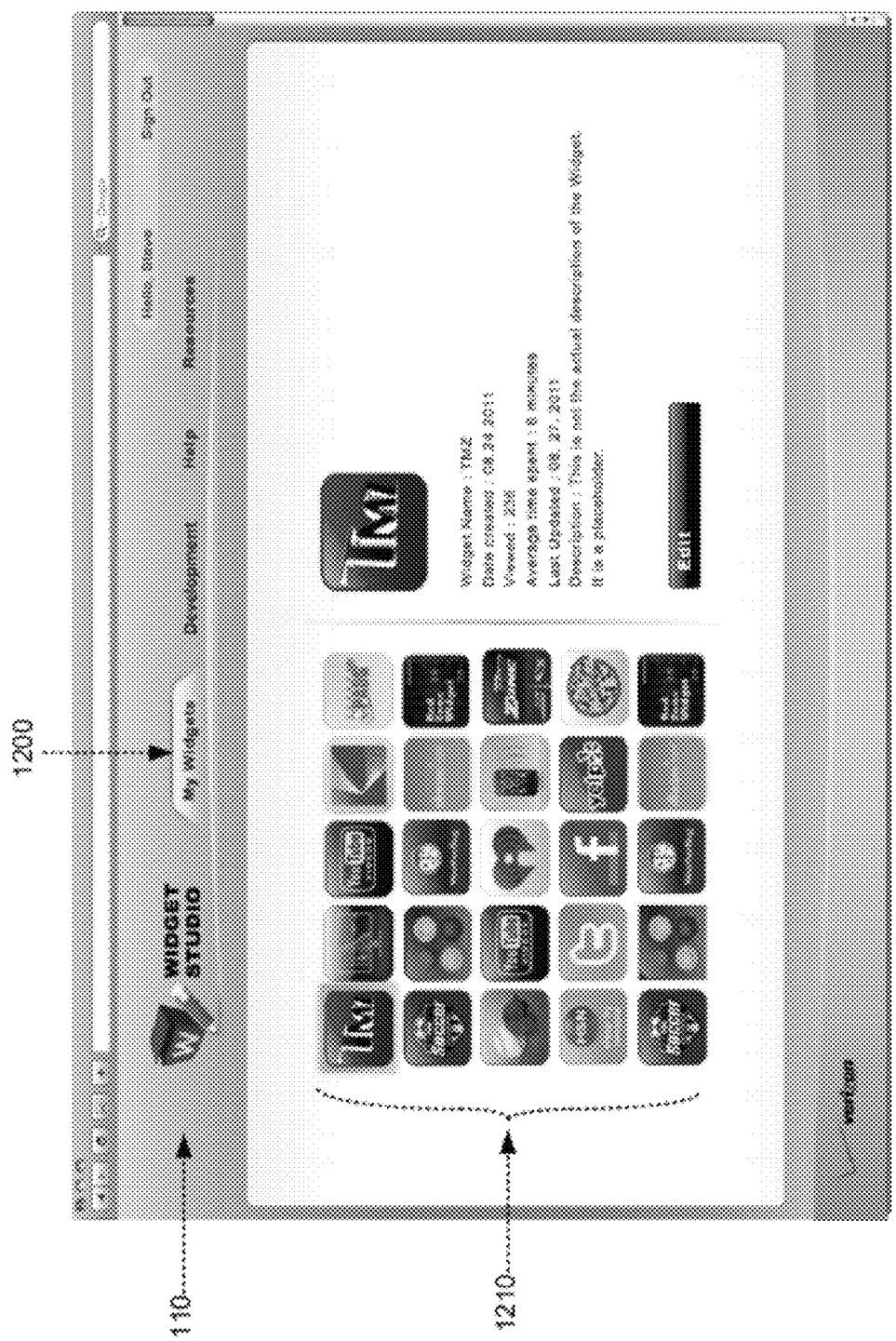

Widget server 310 may present an interface associated with widget development tool 110 to the user of device 100 (block 910). For example, FIG. 12 depicts widget development tool 110's interface as presented to a user via web interface 105. Widget development tool 110 may include a "My widgets" tab 1200 that permits the user to select from a set 1210 of previously created custom widgets. As further shown in the example of FIG. 13, widget development tool 110 may include a "development" tab 1300 that permits the user to retrieve and display the script of an existing custom widget, enter or edit the script associated with a custom widget, compile a created custom widget, and/or run a custom widget.

Figure 13:
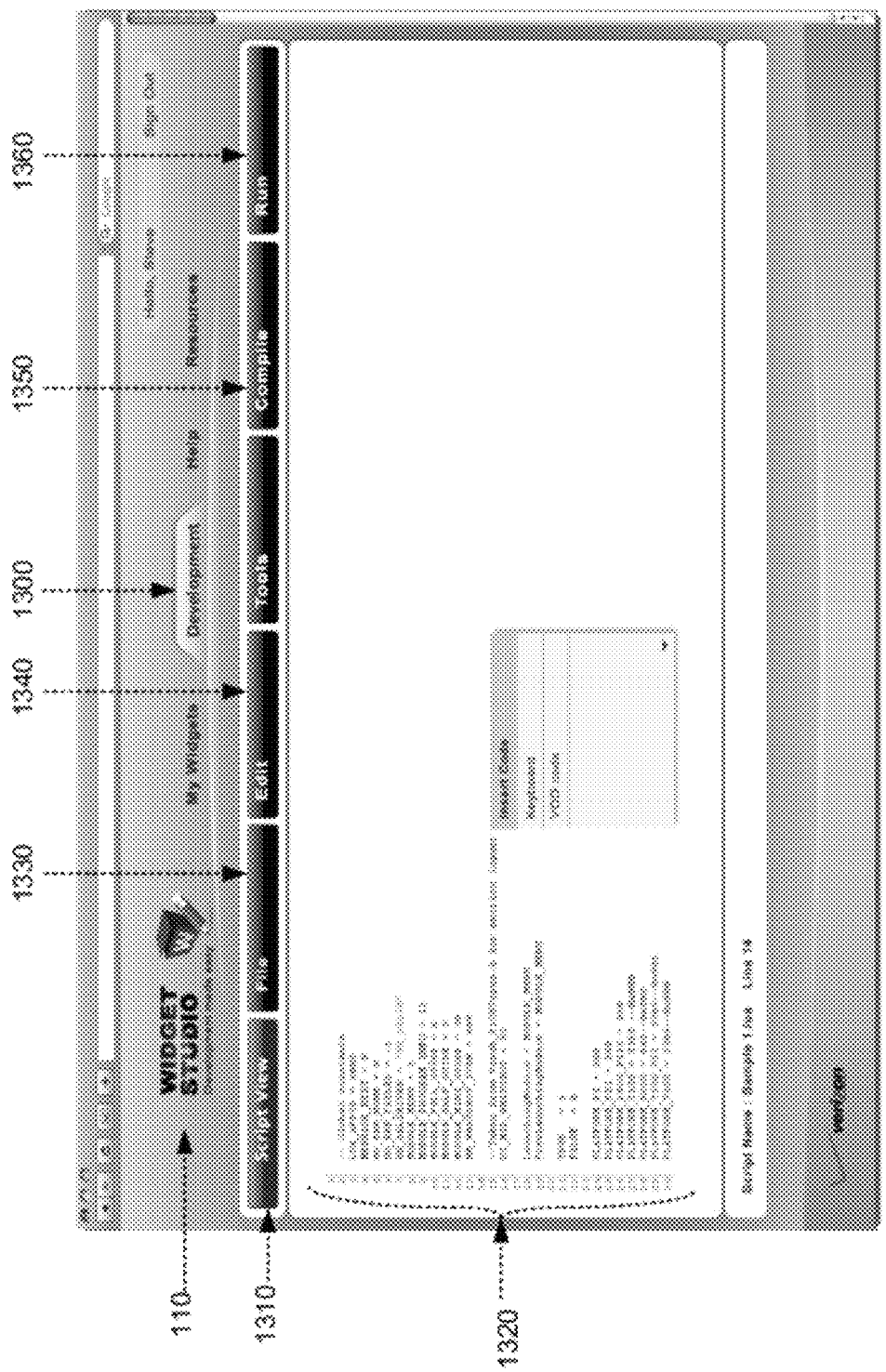

Widget server 310 may receive a selection of a custom user widget (block 915). Referring to the example of FIG. 12, the user of device 100 may select a custom widget from set 1210 of previously created custom widgets. Alternatively, as shown in the example of FIG. 13, the user of device 100 may select "file" button 1330 to open an existing widget, or to create a new widget. Widget server 310 may receive user entered script for the custom widget (block 920). In the example of FIG. 13, the user of device 100 may select "script view" button 1310 to view the script of an existing widget, or the script of a new widget being created. The user of device 100 may insert new lines of script 1320 into an existing widget, or into the new widget being created. Widget server 310 may determine if the script entry has finished (block 925). For example, the user may select "file" button 1330 from widget development tool 110 and may further select a "save as" button (not shown in FIG. 13) to store the script of the custom widget as a retrievable file. Widget server 310 may store the widget in widget DB 320. For example, widget server 310 may store the widget in an entry 700 of widget DB 220, including storing the widget's script in script field 720, a unique identifier for the widget in widget ID field 710, and data describing the widget in widget description field 730. If the script entry has not finished (NO—block 925), then the exemplary process may return to block 920 with the receipt of additional user entered script for the custom widget. If the script entry has finished (YES—block 925), then widget server 310 may determine if the user has chosen to compile the script (block 930). For example, the user of device 100 may select "compile" button 1350 from widget development tool 110 to compile the custom widget. If the user has not chosen to compile the script of the widget (NO—block 930), then the exemplary process may return to block 920 with the receipt of additional user entered script for the custom widget. If the user has chosen to compile the script of the widget (YES—block 930), then widget server 310 may compile the script of the widget (block 935) for debugging and/or running of the widget.

Figure 14:
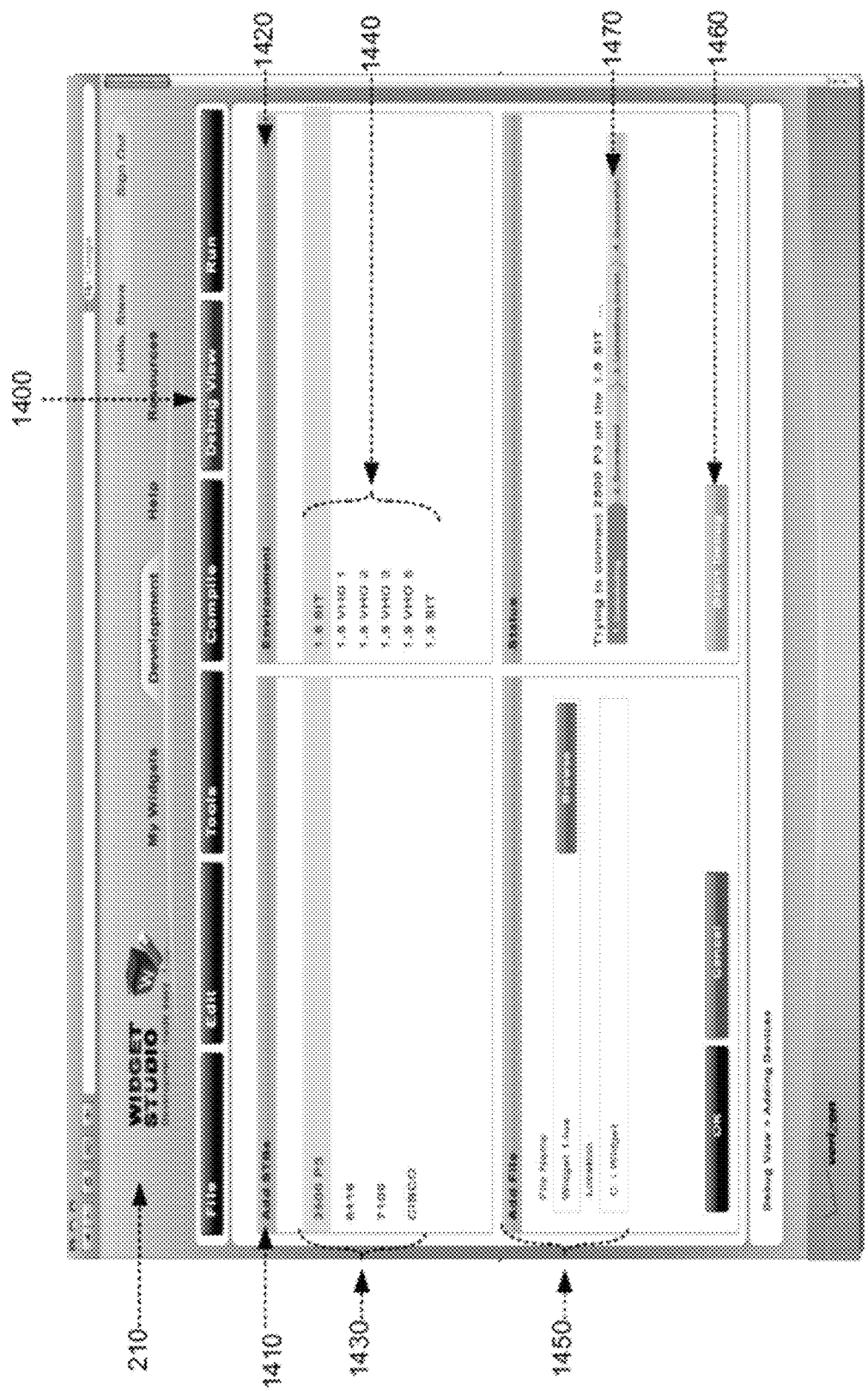

Widget server 310 may determine whether debugging of the script has been selected (block 940). For example, as shown in FIG. 14, the user of device 100 may select "debug view" button 1400 from widget development tool 110 to debug a custom widget in debug mode. If debugging of the script has not been selected (NO—block 940), then the exemplary process may continue at block 960. If debugging of the script has been selected (YES—block 940), then widget server 310 may receive a STB type and STB environment selection for debugging of the script (block 945).

Figure 15:
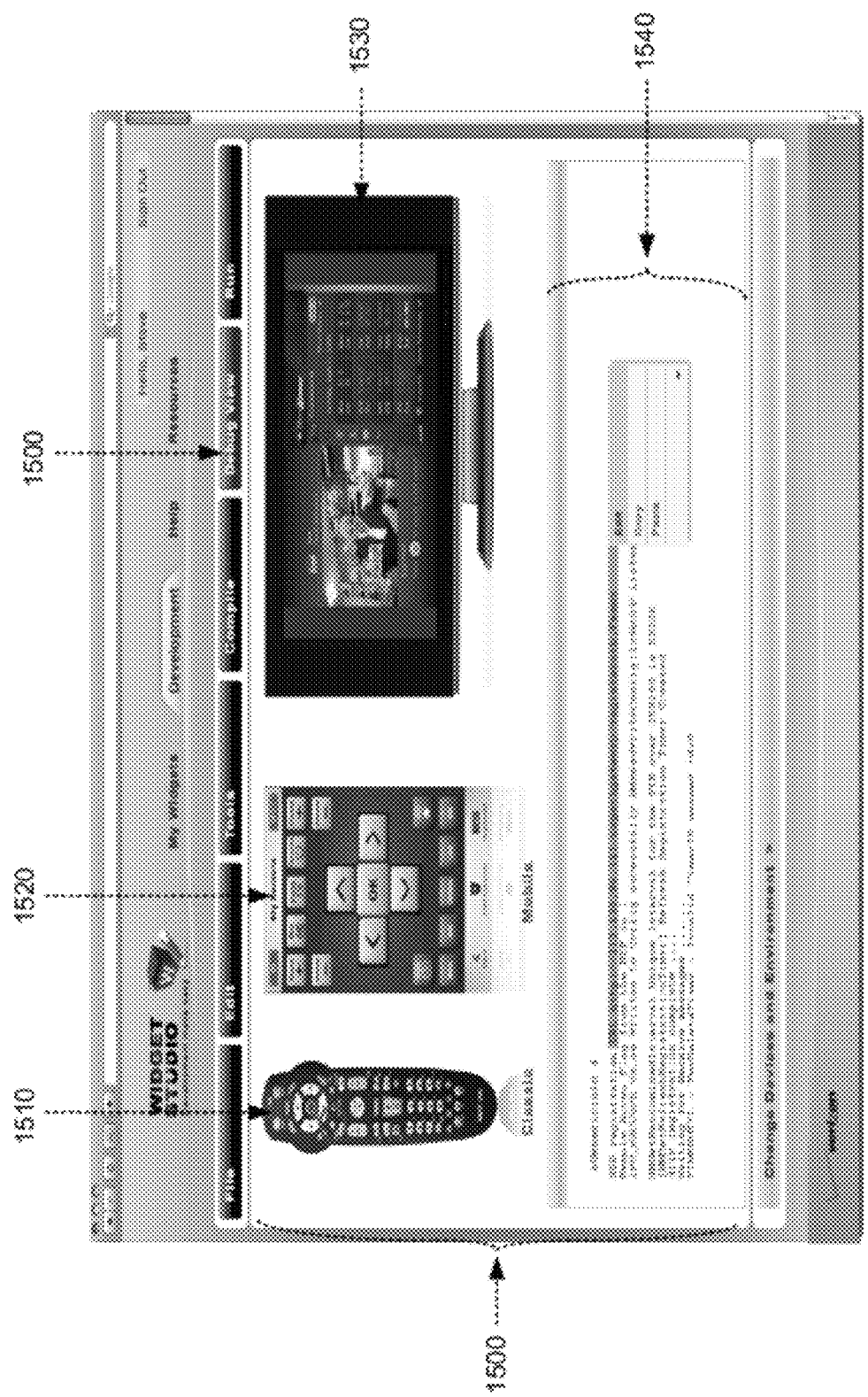

The user of device 100 may select both a STB type and STB environment for a STB within which the custom widget can be executed in debug mode. As shown in FIG. 14, widget development tool 110 may present a window 1410 from which different types of STBs may be selected from a list 1030 of types of STBs. As further depicted in FIG. 14, widget development tool 110 may present another window 1420 from which different types of STB environments may be selected from a list 1440 of environments that corresponds to the STB type selected from list 1430. For example, as depicted in FIG. 14, the STB type "2500 P3" has the environments "1.8 SIT," "1.8 VHO 1," "1.8 VHO 2," "1.9 VHO 3," "1.9 VHO 5," and "1.9 SIT" that may be selected. Upon completion of selection of the STB type from window 1410 and STB environment from window 1420, the user of device 100 may select the widget to be executed in debug mode via an "add file" window 1450. In the example of FIG. 14, the user of device 100 may start the debugging of the selected widget by selecting "start debug" button 1460 from widget development tool 110. Widget server 310 may upload the custom widget to a STB, in cloud environment 120, having the selected STB type and STB environment (block 950). For example, referring to FIG. 3, if STB "type 2" and STB "environment 2" have been selected by the user, then widget server 310 may upload the custom widget to STB 145-x+1 of cloud environment 120. FIG. 14 depicts an upload status 1460 being displayed in widget development tool 110 which displays the connection state of widget server 310 with the STB, and the status of the upload of the script of the widget into the STB. Widget server 310 may execute the script in debug mode based on the selected STB type and STB environment and display the debug results in a debug view (block 955). FIG. 15 depicts an example debug view 1500 in which the interaction of virtual remote devices 1510 and 1520 can be depicted, and the resulting operations of the STB can be displayed 1530 as the debug mode steps through the displayed script 1540.

Widget server 310 may determine whether editing of the script has been selected (block 960). Subsequent to debugging the script of the widget, the user of device 100 may decide to revise the script of the widget (e.g., add to, delete from, or correct) and may select "edit" button 1340 (FIG. 13) from widget development tool 110. If editing of the script has been selected (YES—block 960), then the exemplary process may return to block 920 with user entry of revisions to the previously entered script. If editing of the script has not been selected (NO—block 960), then widget server 310 may determine whether running of the custom widget has been selected (block 965). The user of device 100 may select "run" button 1360 from widget development tool 110 (FIG. 13) to execute the widget. If running of the custom widget has not been selected (NO—block 965), then the exemplary process may return to block 910. If running of the custom widget has been selected (YES—block 965), then widget server 310 may receive a selection of a STB type and a STB environment for running the widget (block 970). Similar to selecting the debug mode shown in FIG. 14, the user of device 100 may select a STB device type from list 1430 of window 1410, and a corresponding STB environment from list 1440 of window 1420. Widget server 310 may upload the custom widget to a STB in cloud environment 120 having the selected STB type and STB environment (block 975). FIG. 14 depicts an upload status 1470 being displayed in widget development tool 110 which displays the connection state of widget server 310 with the STB, and the status of the upload of the script of the widget into the STB.

Widget server 310 may display the results of the run of the custom widget in the selected STB type and STB environment (block 980). Similar to the debug view 1500 of FIG. 15, the interaction of remote devices 1510 and 1520 can be depicted, and/or the resulting operations of the STB can be displayed 1530 as the widget is executed. The user of device 100 may, thus, interact with remote devices 1510 and/or 1520 in debug view 1500 during the run of the custom widget in the debug mode. The exemplary process may return to block 960 with a determination of whether the user at device 100 desires to edit the script of the custom widget.

The exemplary process of FIGS. 9A-9C may be selectively repeated by a single user to create, debug and/or test multiple different custom widgets. The exemplary process of FIGS. 9A-9C may also be selectively performed by multiple different users at devices 100-1 through 100-q. Therefore, at any one time, widget server 310 may perform multiple parallel versions of the exemplary process of FIGS. 9A-9C such that different users at different ones of devices 100-1 through 100-q may be simultaneously creating and storing custom widgets via a web interface 105. Subsequent to creation and/or testing of a custom widget using the exemplary process of FIGS. 9A-9C, the created widgets may be stored in widget DB 320 and then subsequently uploaded to one or more other STBs (e.g., STBs 440-1 through 440-M of FIGS. 4A and 4B) connected to network 115 for future execution by those one or more STBs. Thus, custom widgets created using the exemplary process of FIGS. 9A-9C may be made available for uploading to various STBs for execution at those STBs. In some circumstances, for example, a created first STB widget may be uploaded to a first set of STBs, and a created second STB widget may be uploaded to a second set of STBs, where the first set of STBs may be different than the second set.

The exemplary process of FIGS. 9A-9C has been described as being implemented by widget server 310. However, in some implementations, the exemplary process of FIGS. 9A-9C may be implemented, at least in part, by, or in conjunction with, at least one of STBs 145-1 through 145-N and/or widget DB 310.

Figure 16:
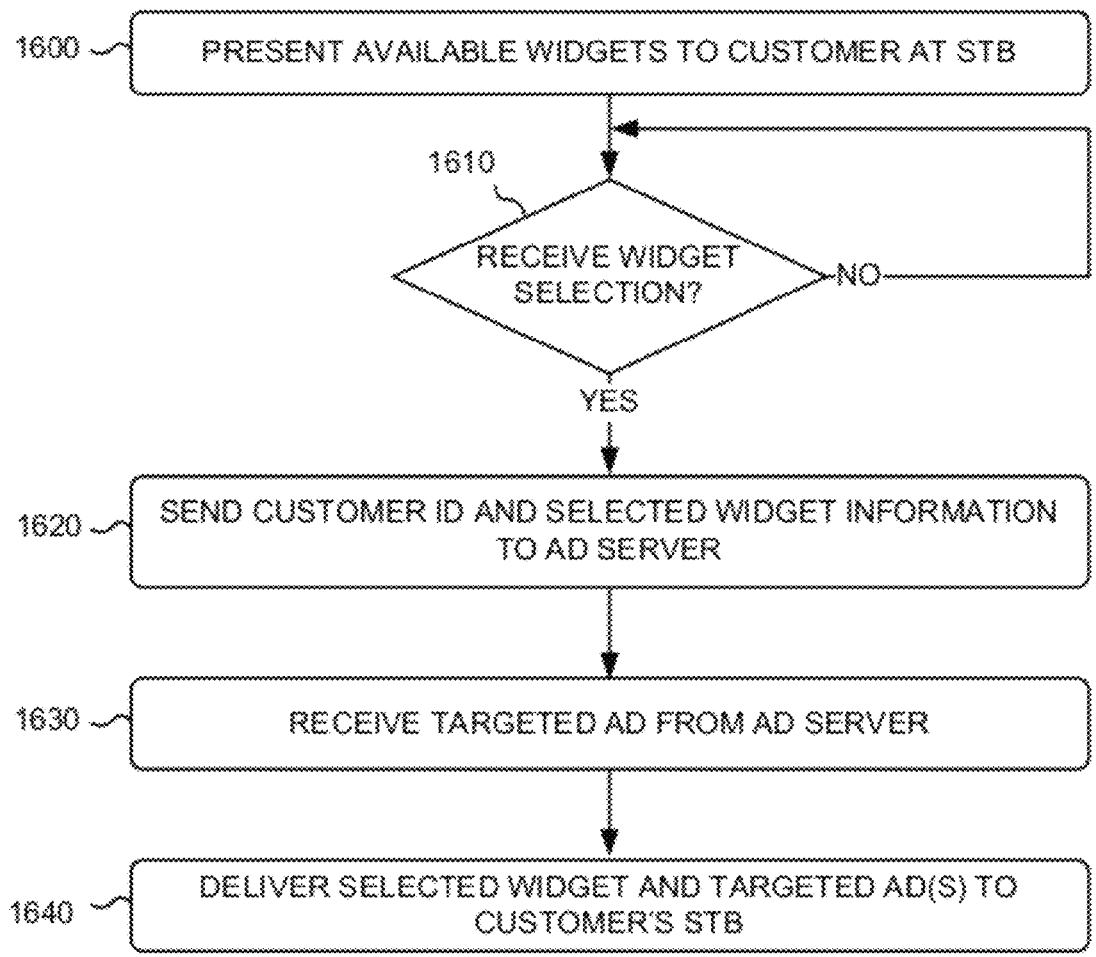
FIG. 16 is a flow diagram that depicts an exemplary process for providing targeted ads, in conjunction with widgets, to customer STBs from the widget server of FIG. 2.

FIG. 16 is a flow diagram that depicts an exemplary process for providing targeted ads, in conjunction with widgets, to customer STBs from widget server 220. The exemplary process of FIG. 16 may be implemented by widget server 220. The description of the exemplary process of FIG. 16 below refers to the examples of FIGS. 17 and 18.

Figure 17:
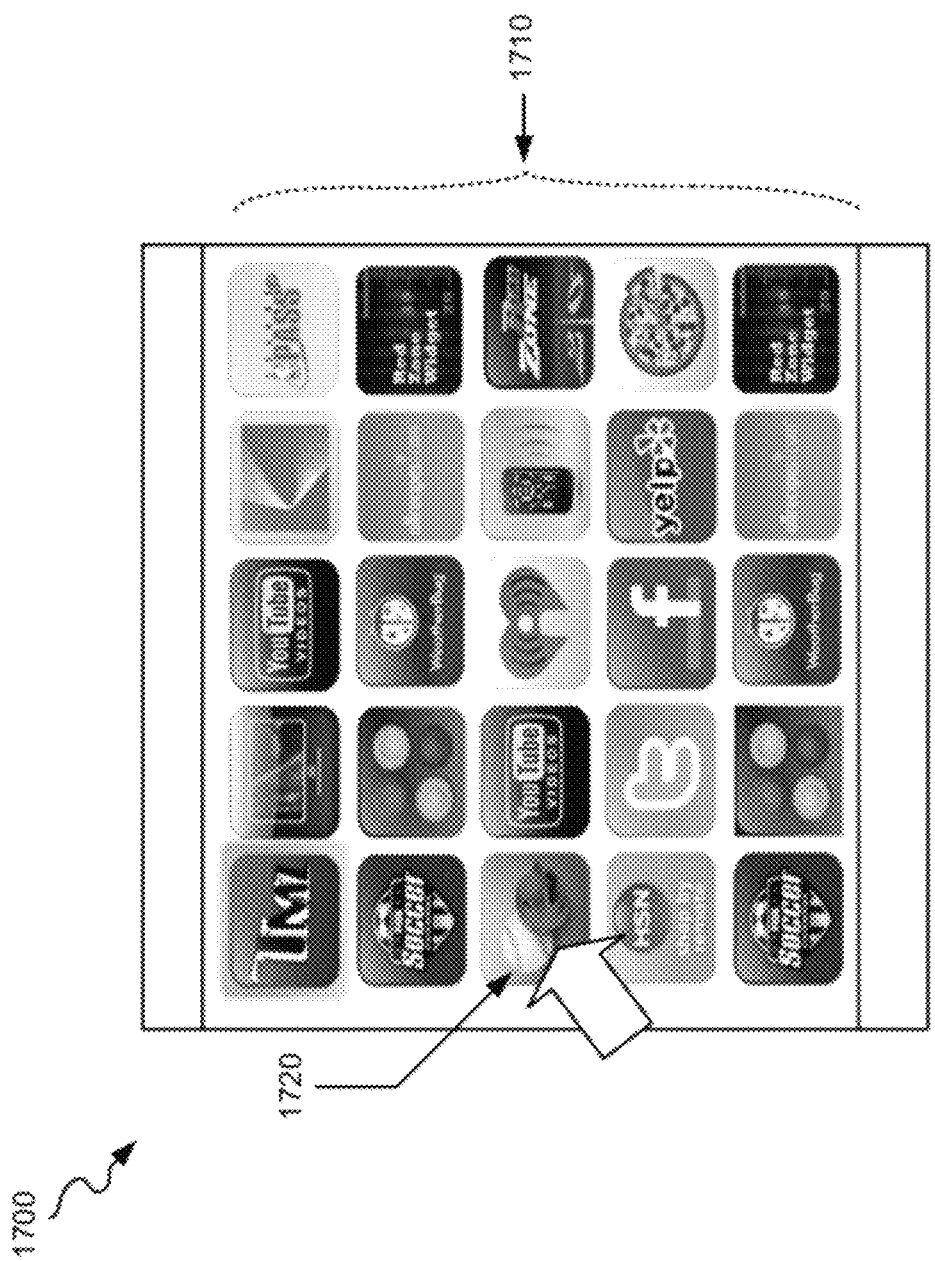
FIGS. 17 and 18 are diagrams that depict examples associated with the exemplary process of FIG. 16.

The exemplary process may include widget server 220 presenting available widgets to a customer at a STB 440 (block 1600). For example, as depicted in FIG. 17, widget server 220 may present a widget interface 1700 to STB 440 via network 115. Widget interface 1700 may display a list 1710 of various widgets that may have been created, using widget development tool 110 shown in FIG. 1, and that are available for use. As shown, the customer at STB 440 may select 1720 a specific widget from widget interface 1700.

Widget server 220 may determine if it has received a widget selection from the customer via STB 440 (block 1610). If not (NO—block 1610), then widget server 220 may wait until a widget selection is received from the customer. If a widget selection is received (YES—block 1610), then widget server 220 may send the customer's ID and information associated with the selected widget to ad server 410 (block 1620). The customer's ID may include a unique identifier associated with the customer. The information associated with the selected widget may include, for example, a name of the widget, a unique identifier associated with the widget, and/or a summary description of the function(s) that the widget performs. Referring back to FIG. 4B, widget server 220 is shown sending the customer ID and widget information 465 to ad server 410. Widget server 220 may send the customer's ID and widget information to ad server 410 via network 115.

Widget server 220 may receive a targeted ad from ad server 410 (block 1630). Upon receipt of the widget information and the customer ID, ad server 410 may target an ad to the customer based on the widget information, the customer ID and customer other data as described below with respect to the exemplary process of FIGS. 20A and 20B.

Figure 18:
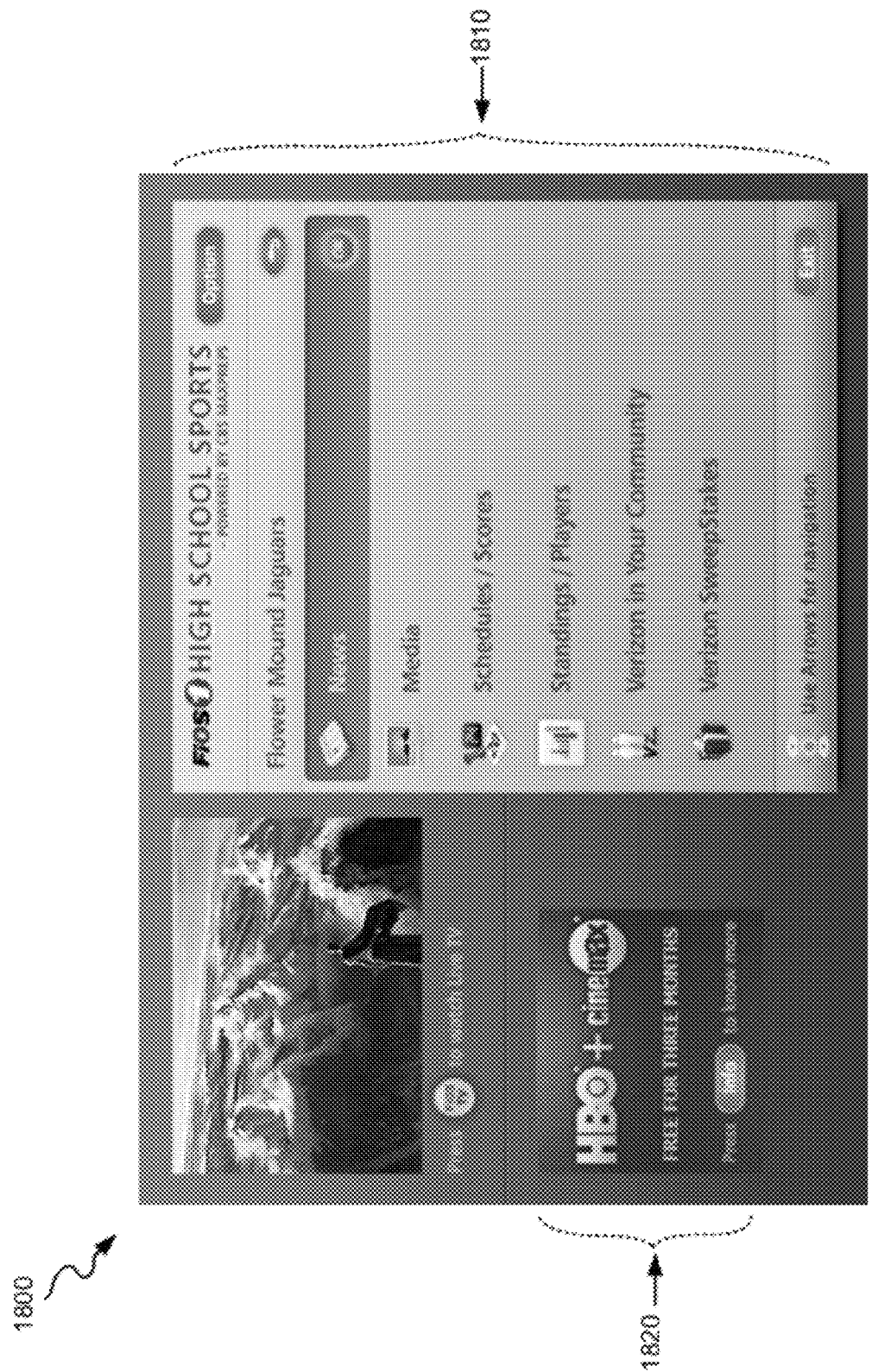

Widget server 220 may deliver the selected widget and the targeted ad(s) to the customer's STB 440 (block 1640). Referring again to FIG. 4B, widget server 220 is shown sending 475 the selected widget and the targeted ad(s) to STB 440. FIG. 18 depicts a STB screen 1800, displayed at a STB 440, that includes a widget 1810 and targeted ad 1820 received at STB 440 from widget server 220. The customer at STB 440 may select targeted ad 1820 to receive additional advertisement information regarding the advertised product or service. Targeted ad 1820 is shown in FIG. 18 with a square shape. However, targeted ad 1820 may be generated to have a shape and size that is supported by the widget 1810 in which it will be displayed. Therefore, targeted ad 1820 may be any appropriate size and shape (e.g., rectangular, square, circular, etc.) based on the size and shape of widget 1810 within screen 1800.

Figure 19:
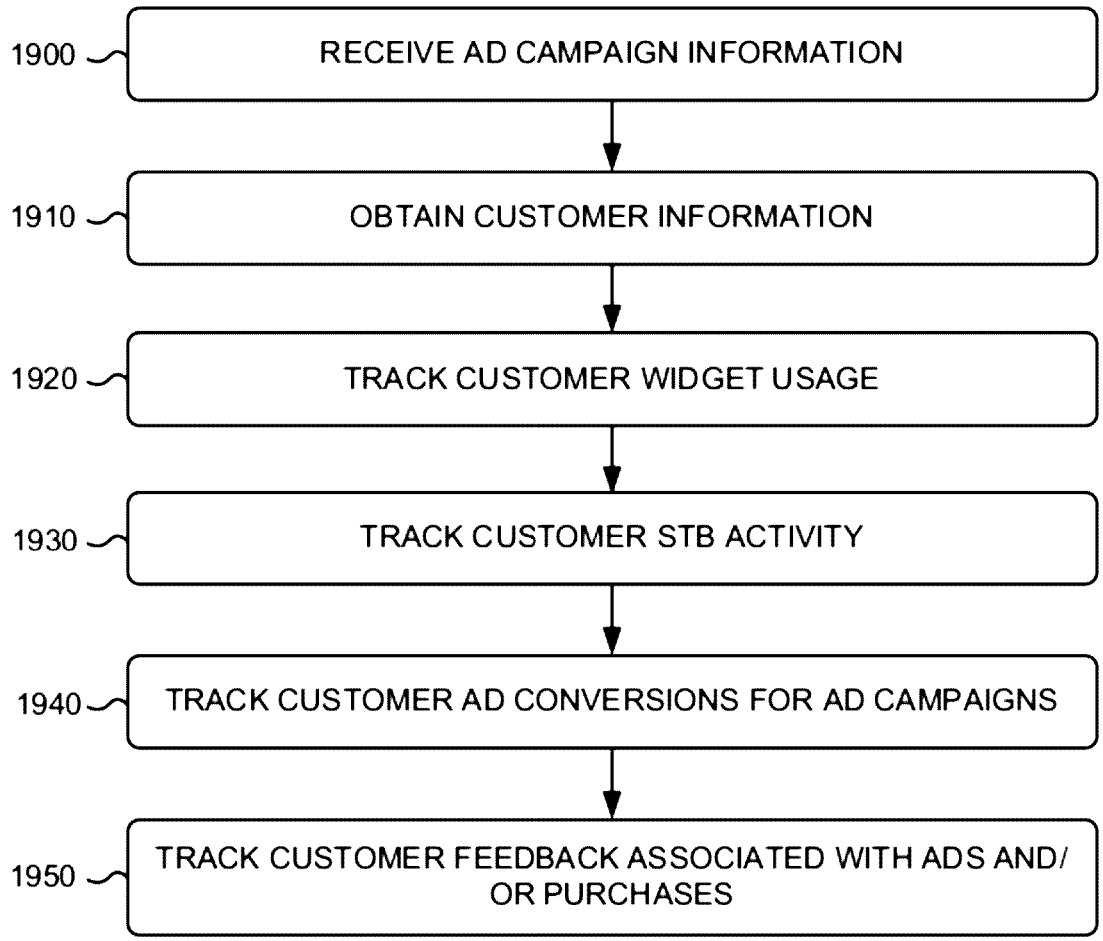
FIG. 19 is a flow diagram that depicts an exemplary process for receiving ad campaign information and customer information, and for tracking customer widget usage, customer STB activity, customer ad conversions and customer feedback.

FIG. 19 is a flow diagram that depicts an exemplary process for receiving ad campaign information and customer information, and for tracking customer widget usage, customer STB activity, customer ad conversions and customer feedback. The exemplary process may be implemented by ad server 410, in conjunction with ad campaign DB 420 and customer tracking DB 430.

The exemplary process may include ad server 410 receiving ad campaign information (block 1900). Ad server 410 may receive ad campaign information from one or more ad campaign administrators via ad administration portal 450. The ad campaign information may include the details of an ad campaign for advertising a product or service. The ad campaign information may include, for example, the visual advertisement (e.g., graphics, images, etc.), a short description of the advertisement, keywords related to the advertisement (e.g., type of product or service advertised), a length of the ad campaign, and keywords related to customers to be targeted by the ad campaign. The ad campaign information may include additional information related to the ad campaign not described here.

Ad server 410 may obtain customer information (block 1910). The customer information may include various types of information related to customers at STBs 440-1 through 440-m. The customer information may include, for example, each customer's name, each customer's address, and each customer's subscribed services. The customer information may include additional information related to the customers not described here. Customer information unit 640 may receive the customer information via ad admin unit 600 and store the customer information in customer info field 830 of customer tracking DB 430.

Ad server 410 may track customer widget usage (block 1920). The customer widget usage may include data related to the customer's usage of widgets stored in widget DB 310. The tracked customer widget usage may include, for example, the identifiers of widgets customers retrieved from widget server 220, dates and times associated with the widget retrievals, and dates and times associated with actual execution of the widgets at STBs 440-1 through 440-m. The customer widget usage may include additional information related to the customers' widget usage not described here. Widget usage tracker 610 may track the customer widget usage and may store associated data in customer widget usage 830 field for respective customers identified in customer ID field 810.

Ad server 410 may track customer STB activity (block 1930). The customer STB activity may include various types of actions performed by customers at STBs 440-1 through 440-m include, for example, Video On Demand (VOD) viewing; channels, programs and/or movies watched; and/or programs and/or movies set for digital video recording. Other types of STB activity may be tracked by ad server 410. Ad server 410 may store customer STB activity in field 840 of customer tracking DB 430 in entries 800 corresponding to the customers identified in customer ID field 810.

Ad server 410 may track customer ad conversions for ad campaigns (block 1940). The ad conversions may include each selection of a targeted ad by a customer to view the corresponding advertisement or, alternatively, the ad conversions may include each order, or purchase, of an advertised product or service that the customer makes after viewing the associated targeted advertisement. Ad conversion tracker 650 may store the ad conversion information in field 850 of customer tracking DB 430 in entries 800 corresponding to the customers identified in customer ID field 810.

Ad server 410 may track customer feedback associated with ads and/or purchases (block 1950). Subsequent to viewing a targeted ad, or subsequent to ordering or purchasing a product or service advertised in a targeted ad to a customer, the customer may provide feedback regarding the targeted ad, or the product or service that was purchased. Customer feedback tracker 630 may store data related to each customer's feedback in field 860 of entries 800 corresponding to the customers identified in customer ID field 810.

Figure 20A:
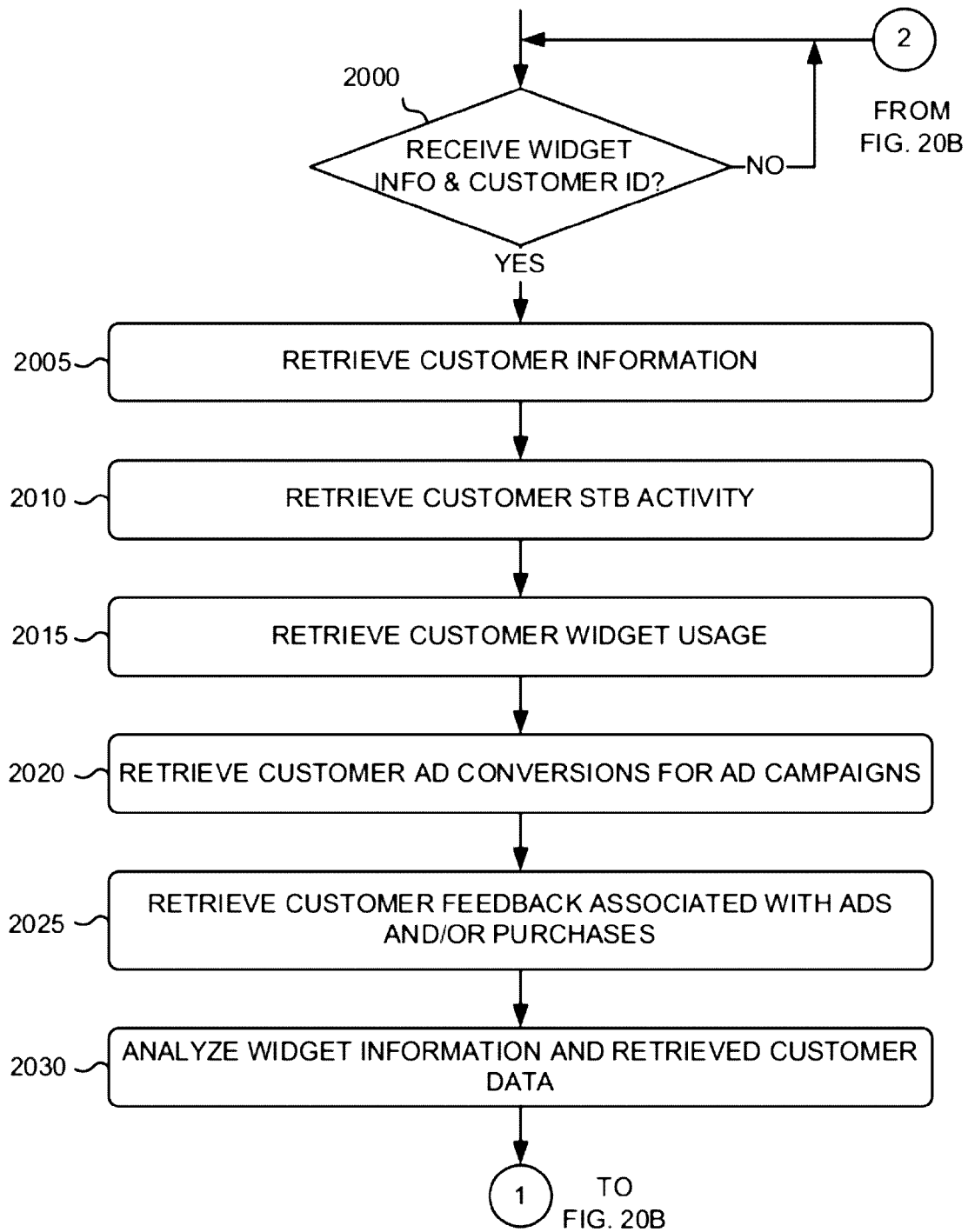
FIGS. 20A and 20B are flow diagrams that depict an exemplary process for targeting ads to customers based on widget information and retrieved customer data.
Figure 20B:
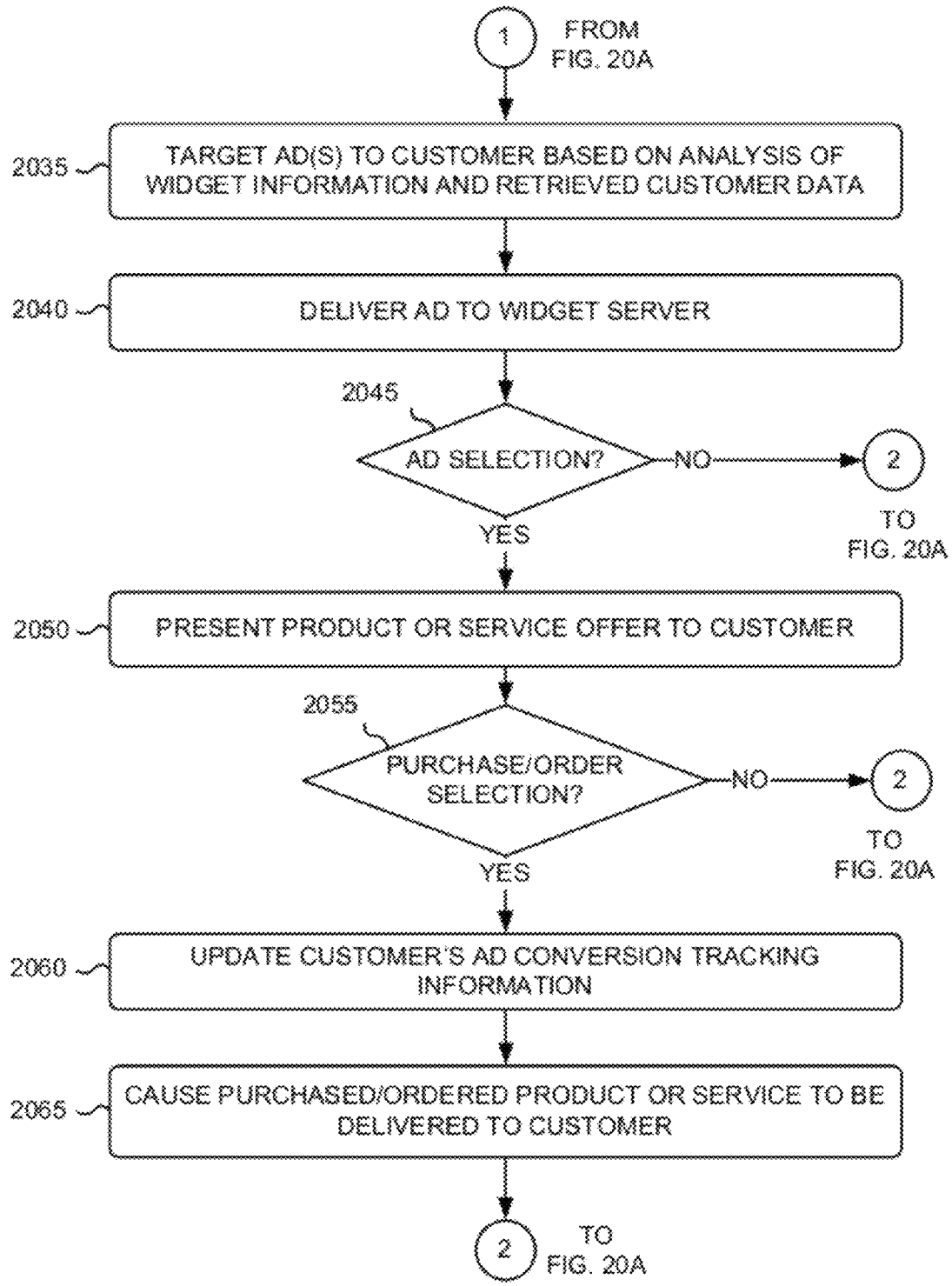

FIGS. 20A and 20B are flow diagrams that depict an exemplary process for targeting ads to customers based on widget information and retrieved customer data. The exemplary process of FIGS. 20A and 20B may be implemented by ad server 410. The description of the exemplary process of FIGS. 20A and 20B below refers to the examples of FIG. 21.

The exemplary process may include ad server 410 determining whether it has received widget information and a customer ID (block 2000). Referring back to FIG. 4B, once widget server 220 receives a widget selection 455 from a STB 440, widget server 220 may send 465 the widget information and the customer ID to ad server 410 for ad targeting. If widget information and a customer ID has been received (YES—block 2000), then ad server 410 may retrieve customer information associated with the received customer ID (block 2005). Customer information unit 640 of ad server 410 may index customer tracking DB 430 to identify an entry 800 whose customer ID field 810 matches the customer ID received from widget server 220. Customer information unit 640 may retrieve the data stored in customer information field 820 from the identified entry 800.

Ad server 410 may retrieve customer STB activity associated with the received customer ID (block 2010). Ad server 410 may index customer tracking DB 430 to identify an entry 800 whose customer ID field 810 matches the customer ID received from widget server 220. Ad server 410 may retrieve the data stored in customer STB activity field 840 from the identified entry 800.

Ad server 410 may retrieve customer widget usage associated with the received customer ID (block 2015). Widget usage tracker 610 of ad server 410 may index customer tracking DB 430 to identify an entry 800 whose customer ID field 810 matches the customer ID received from widget server 220. Ad server 410 may retrieve the data stored in customer widget usage field 830 from the identified entry 800. Ad server 410 may retrieve customer ad conversions, for the customer associated with the received customer ID, for ad campaigns (block 2020). Ad conversion tracker 650 of ad server 410 may index customer tracking DB 430 to identify an entry 800 whose customer ID field 810 matches the customer ID received from widget server 220. Ad server 410 may retrieve the data stored in customer ad conversions field 850 from the identified entry 800.

Ad server 410 may retrieve customer feedback associated with ads and/or purchases (block 2025). Customer feedback tracker 630 of ad server 410 may index customer tracking DB 430 to identify an entry 800 whose customer ID field 810 matches the customer ID received from widget server 220. Ad server 410 may retrieve the data stored in customer feedback field 860 from the identified entry 800.

Ad server 410 may analyze the widget information and the retrieved customer data (block 2030). Ad server 410 may perform any number of different algorithms for analyzing the widget information received from widget server 220, and/or the customer data retrieved in blocks 2005, 2010, 2015, 2020 and/or 2025, for the purpose of identifying ads, among currently active ad campaigns, for presenting to the customer in conjunction with the customer-selected widget. Ad server 410 may analyze the customer's widget usage, STB activity, previous ad conversions, customer feedback, and/or information associated with the customer and compare the customer data with the ad campaign information (e.g., ad's description, keywords related to the advertisement, keywords related to customers to be targeted by the ad campaign, etc.) obtained in block 1900 of the exemplary process of FIG. 19.

Ad server 410 may target an ad(s) to the customer based on an analysis of the widget information and the retrieved customer data (block 2035). Ad server 410 may select one or more ads from currently active ad campaigns based on the analysis of the widget information the retrieved customer data performed in block 2030. Ad server 410 may deliver the targeted ad(s) to widget server 220 (block 2040). Referring back to FIG. 4B, ad server 410 delivers the targeted ad(s) 470 to widget server 220 which, in turn, delivers the selected widget and the ad(s) to the customer at the customer's STB 440, as described above with respect to block 1640 of FIG. 16 and FIG. 18.

Figure 21:
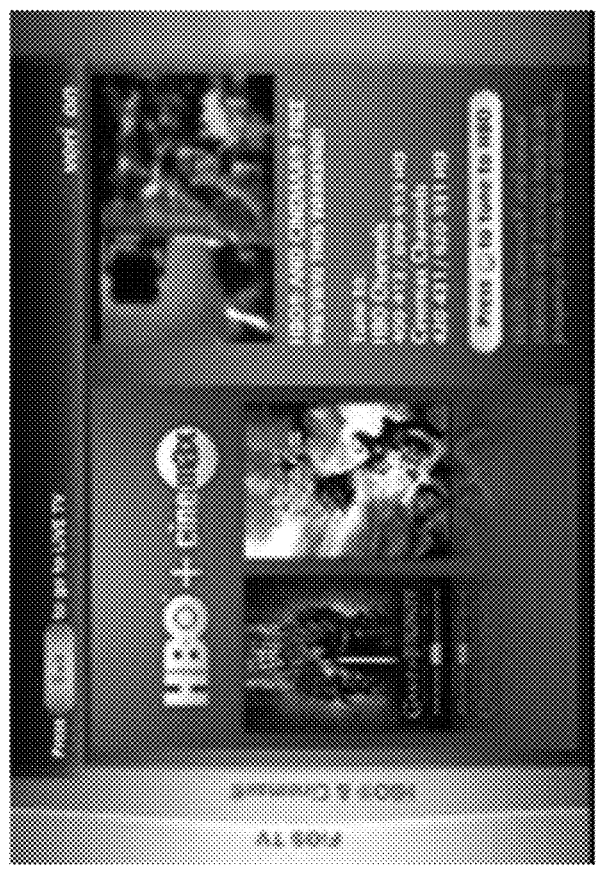
FIG. 21 is a diagram that depicts an example associated with the exemplary process of FIGS. 20A and 20B.

Ad server 410 may determine if the customer has selected the ad (block 2045). Referring to FIG. 18, when viewing advertisement 1820 on STB 440, the customer may select (e.g., by pressing an appropriate button on the STB's remote control) the advertisement 1820 to receive additional details about the product or service offered by the advertisement. If the customer has selected the ad (YES—block 2050), then ad server 410 may present a product or service offer to the customer (block 2050). FIG. 21 depicts a specific example of a product or service offer 2100 presented to a customer based on the customer's selection of the advertisement 1820 of FIG. 18.

Ad server 410 may determine if the customer has made a purchase or order selection from the offer of block 2050 (block 2055). The customer may choose to purchase or order the offered product or service by, for example, pressing an appropriate button on the STB's remote control. A button to be pressed to initiate the purchase of the product or service may be specified in the product or service offer. If the customer has made a purchase or order selection from the offer (YES—block 2060), then ad server 410 may update the customer's ad conversion tracking information (block 2060). Ad server 410 may update customer ad conversions field 850 of customer tracking DB 430 based on the customer's ID. Ad server 410 may cause the purchased/ordered product or service to be delivered to the customer (block 2065). If the offer was related to a product, than ad server 410 may cause the product to be ordered and shipped to the customer (e.g., by delivering an electronic order request). If the offer was related to a service, such as, for example, a cable network service, then the requested service may automatically be made available to the customer at the customer's STB 440.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 9A-9C, 16, 19, 20A and 20B, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
retrieving, from a database by a first network device, information associated with a plurality of custom widgets customized and created by a plurality of different users, wherein each of the plurality of custom widgets comprises a software application executable by a set-top box (STB) to render graphics or images on a screen, or to perform other functions associated with the STB, and wherein the STB is associated with a customer;
presenting, from the first network device, a widget interface to the STB, wherein the widget interface lists the plurality of custom widgets;
receiving, from the customer via the STB, selection of a first custom widget from the plurality of custom widgets presented in the widget interface, for launching and execution at the STB;
tracking widget usage, of the first custom widget and other custom widgets of the plurality of custom widgets, by the customer to produce first tracked data, wherein tracking the widget usage comprises tracking identifiers of the first custom widget and the other custom widgets of the plurality of custom widgets selected by the customer, tracking dates and times associated with selections of the first custom widget and the other custom widgets of the plurality of custom widgets by the customer, and tracking dates and times associated with execution of the first custom widget and the other custom widgets of the plurality of custom widgets at the STB, and tracking STB activity of the customer to produce second tracked data, wherein tracking the STB activity comprises tracking Video On Demand (VOD) viewing of the customer; tracking at least one of channels, programs or movies watched by the customer; and tracking at least one of programs or movies set for digital video recording by the customer at the STB;

obtaining, at the first network device, an advertisement that is targeted to the customer based on an identity of the customer, information associated with the customer, information associated with the selected first custom widget, the first tracked data, and the second tracked data, wherein the advertisement relates to a product or service available for purchase; and delivering, from the first network device, the selected first custom widget and the targeted advertisement to the STB associated with the customer.

2. The method of claim 1, further comprising:
performing at least one of the following:
tracking ad conversions associated with the customer for ad campaigns to produce third tracked data; or
tracking feedback associated with ads or purchases, associated with the customer, to produce fourth tracked data.

3. The method of claim 2, wherein the advertisement is targeted to the customer based further on at least one of the third tracked data or the fourth tracked data.

4. The method of claim 1, further comprising:
receiving a customer selection of the targeted advertisement via the STB; and
presenting, responsive to the customer selection of the targeted advertisement, an offer for purchasing the product or service to the customer via the STB.

5. The method of claim 4, further comprising:
receiving a purchase selection of the product or service from the customer via the STB; and
causing the product or service to be delivered to the customer based on the received purchase selection.

6. The method of claim 1, wherein obtaining the targeted advertisement comprises:
sending a unique identifier that indicates the identity of the customer, and the information associated with the selected first custom widget, from the first network device to a second network device;
analyzing, at the second network device, the information associated with the customer, the information associated with the selected first custom widget, the first tracked data, and the second tracked data; and
selecting, at the second network device, the advertisement that is targeted to the customer based on the analysis, and returning the targeted advertisement to the first network device from the second network device.

7. The method of claim 2, wherein obtaining the targeted advertisement comprises:
sending a unique identifier that indicates the identity of the customer, and the information associated with the selected first custom widget, from the first network device to a second network device;
analyzing, at the second network device, the information associated with the customer, the information associated with the selected first custom widget, the first tracked data, the second tracked data, and at least one of the third tracked data or the fourth tracked data; and
selecting, at the second network device, the advertisement that is targeted to the customer based on the analysis, and returning the targeted advertisement to the first network device from the second network device.

8. The method of claim 1, wherein the information associated with the selected first custom widget comprises a name of the first custom widget, and a summary description of a function that the first custom widget performs.

9. The method of claim 1, wherein the first tracked data comprises data associated with the identifiers of the first custom widget and the other custom widgets of the plurality of custom widgets selected by the customer, data associated with the dates and times associated with the selections of the first custom widget and the other custom widgets of the plurality of custom widgets by the customer, and data associated with the dates and times associated with the execution of the first custom widget and the other custom widgets of the plurality of custom widgets at the STB, and
wherein the second tracked data comprises data associated with the Video On Demand (VOD) viewing of the customer; data associated with the at least one of the channels, programs or movies watched by the customer; and data associated with the least one of the programs or movies set for digital video recording at the STB by the customer.

10. A system, comprising:
a first network device, comprising:
a first communication interface; and
a first processing unit configured to:
retrieve, from a database via the first communication interface, information associated with a plurality of custom widgets customized and created by a plurality of different users, wherein each of the plurality of custom widgets comprises a software application executable by a set-top box (STB) to render graphics or images on a screen, or to perform other functions associated with the STB, and wherein the STB is associated with a customer,
present, a widget interface to the STB via the first communication interface, wherein the widget interface lists the plurality of custom widgets,
receive, from the customer via the STB, selection of a first custom widget from the plurality of custom widgets presented in the widget interface, for launching and execution at the STB,
obtain an advertisement that is targeted to the customer based on an identity of the customer, information associated with the customer, information associated with the selected first custom widget, first tracked data related to tracking customer widget usage of the first custom widget and other custom widgets of the plurality of custom widgets, and second tracked data related to tracking STB activity associated with the customer, wherein the advertisement relates to a product or service available for purchase, wherein the first tracked data comprises data associated with identifiers of the first custom widget and the other custom widgets of the plurality of custom widgets selected by the customer, dates and times associated with selections of the first custom widget and the other custom widgets of the plurality of custom widgets by the customer, and dates and times associated with execution of the first custom widget and the other custom widgets of the plurality of custom widgets at the STB, and wherein the second tracked data related comprises data associated with Video On Demand (VOD) viewing of the customer; at least one of channels, programs or movies watched by the customer; and at least one of programs or movies set for digital video recording at the STB by the customer; and cause the selected first custom widget and the targeted advertisement to be delivered to the STB via the first communication interface.

11. The system of claim 10, wherein the advertisement is targeted to the customer further based on third tracked data associated with tracking ad conversions, of ad campaigns, by the customer, and fourth tracked data associated with tracking feedback associated with ads or purchases associated with the customer.

12. The system of claim 11, further comprising:
a second network device, comprising:
a second processing unit configured to:
store the first and the second tracked data and at least one of the third or the fourth tracked data in a second database.

13. The system of claim 11, wherein the advertisement is targeted to the customer based further on at least one of the third or fourth tracked data.

14. The system of claim 10, wherein the first processing unit is further configured to:
receive a customer selection of the targeted advertisement from the STB via the first communication interface; and
present an offer for purchasing the product or service to the customer at the STB via the first communication interface.

15. The system of claim 14, wherein the first processing unit is further configured to:
receive a customer purchase selection of the product or service from the customer's STB, and
cause the product or service to be delivered to the customer based on the received purchase selection.

16. The system of claim 10, wherein, when obtaining the targeted advertisement, the first processing unit is further configured to:
send, via the first communication interface to a second network device, a unique identifier that indicates the identity of the customer, and the information associated with the selected first custom widget, and
receive, via the first communication interface from the second network device, the targeted advertisement, wherein the advertisement is targeted to the customer based on an analysis of the information associated with the customer, the information associated with the selected first custom widget, the first tracked data, and the second tracked data.

17. The system of claim 10, wherein the information associated with the selected first custom widget comprises a name of the first custom widget, and a summary description of a function that the first custom widget performs.

18. The system of claim 10, further comprising:
a second network device, comprising:
a second processing unit configured to:
track the customer widget usage to produce the first tracked data, and
track the STB activity associated with the customer to produce the second tracked data.

19. A non-transitory computer-readable medium containing instructions executable by at least one processor at a network device, the computer-readable medium comprising:
one or more instructions for retrieving, from a database, information associated with a plurality of custom widgets customized and created by a plurality of different users, wherein each of the plurality of custom widgets comprises a software application executable by a set-top box (STB) to render graphics or images on a screen, or to perform other functions associated with the STB, and wherein the STB is associated with a customer;
one or more instructions for presenting, a widget interface to the STB, wherein the widget interface lists the plurality of custom widgets;
one or more instructions for receiving, from the customer via the STB, selection of a first custom widget from the plurality of custom widgets presented in the widget interface, for launching and execution at the STB;
one or more instructions for obtaining an advertisement that is targeted to the customer based on an identity of the customer, information associated with the customer, and information associated with the selected first custom widget, wherein the advertisement relates to a product or service available for purchase, and wherein the advertisement is targeted to the customer further based on:
first tracked data related to tracking widget usage, of the first custom widget and other custom widgets of the plurality of custom widgets, by the customer, wherein the first tracked data comprises data associated with identifiers of the first custom widget and the other custom widgets of the plurality of custom widgets selected by the customer, dates and times associated with selections of the first custom widget and the other custom widgets of the plurality of custom widgets by the customer, and dates and times associated with execution of the first custom widget and the other custom widgets of the plurality of custom widgets at the STB; and
second tracked data related to tracking STB activity associated with the customer, wherein the second tracked data comprises data associated with Video On Demand (VOD) viewing of the customer; at least one of channels, programs or movies watched by the customer; and at least one of programs or movies set for digital video recording at the STB by the customer; and
one or more instructions for delivering the selected first custom widget and the targeted advertisement to the STB associated with the customer.

20. The non-transitory computer-readable medium of claim 19, wherein the advertisement is targeted to the customer based further on at least one of:
third tracked data related to tracking ad conversions, associated with the customer, for ad campaigns; or
fourth tracked data related to tracking feedback associated with ads or purchases associated with the customer.

21. The non-transitory computer-readable medium of claim 19, wherein the information associated with the selected first custom widget comprises a name of the first custom widget, and a summary description of a function that the first custom widget performs.

22. The non-transitory computer-readable medium of claim 19, wherein the one or more instructions for obtaining the advertisement further comprise:

one or more instructions for causing a unique identifier that indicates the identity of the customer, and information associated with the selected first custom widget, to be sent to a second network device; and one or more instructions for receiving, from the second network device, the targeted advertisement, wherein the advertisement is targeted to the customer based on an analysis of the information associated with the customer, the information associated with the selected first custom widget, the first tracked data, and the second tracked data.

23. The non-transitory computer-readable medium of claim 20, wherein the one or more instructions for obtaining the advertisement further comprise:

one or more instructions for causing a unique identifier that indicates the identity of the customer, and information associated with the selected first custom widget, to be sent to a second network device; and one or more instructions for receiving, from the second network device, the targeted advertisement, wherein the advertisement is targeted to the customer based on an analysis of the information associated with the customer, the information associated with the selected first custom widget, the first tracked data, and the second tracked data, and at least one of the third tracked data or the fourth tracked data.

* * * * *